US008051689B1

(12) United States Patent
Shen et al.

(10) Patent No.: US 8,051,689 B1

(45) Date of Patent: Nov. 8, 2011

(54) CYLINDRICAL LOCK WITH AUTOMATIC ELECTRONIC LOCKING FUNCTION

(75) Inventors: Chun-Meng Shen, Xinying (TW); Wei-Chung Hsu, Guiren Township, Tainan County (TW)

(73) Assignee: I-Tek Metal Mfg. Co., Ltd., Tainan (TW)

( * ) Notice: Subject to any disclaimer, the term of this patent is extended or adjusted under 35 U.S.C. 154(b) by 0 days.

(21) Appl. No.: 12/943,991

(22) Filed: Nov. 11, 2010

(51) Int. Cl.

| | |
|---|---|
| ***B60R 25/02*** | (2006.01) |
| ***B62H 5/04*** | (2006.01) |
| ***E05B 13/10*** | (2006.01) |
| ***F16C 3/00*** | (2006.01) |
| ***G05G 5/00*** | (2006.01) |

(52) U.S. Cl. .......... 70/224; 70/277; 70/278.7; 70/279.1; 70/283; 70/283.1

(58) Field of Classification Search .................... 70/277, 70/278.7, 279.1, 283, 283.1, 224
See application file for complete search history.

(56) References Cited

U.S. PATENT DOCUMENTS

| | | | | |
|---|---|---|---|---|
| 4,424,691 | A * | 1/1984 | Foshee | 70/224 |
| 4,465,311 | A * | 8/1984 | Austin | 70/279.1 |
| 5,628,216 | A * | 5/1997 | Qureshi et al. | 70/278.7 |
| 6,279,360 | B1 * | 8/2001 | Shen | 70/224 |
| 6,412,318 | B1 * | 7/2002 | Shen | 70/224 |
| 6,705,138 | B1 * | 3/2004 | Shen | 70/224 |
| 6,802,194 | B1 * | 10/2004 | Shen | 70/224 |
| 6,935,148 | B2 * | 8/2005 | Don | 70/224 |
| 2005/0218665 | A1 * | 10/2005 | Shen | 292/336.3 |

* cited by examiner

*Primary Examiner* — Lloyd Gall
*Assistant Examiner* — David E Sosnowski
(74) *Attorney, Agent, or Firm* — Alan Kamrath; Kamrath & Associates PA

(57) ABSTRACT

A cylindrical lock includes inner and outer chassis, inner and outer spindles, and first and second actuating members. One of the first and second actuating members is selectively and rotatably received in the outer spindle. Each of the first and second actuating members includes a limiting groove having first and second groove sections with different arcs in a circumferential direction about a longitudinal axis. A driving member is rotatably received in one of the first and second actuating members. The driving member has a leg movable in the outer spindle between first and second positions along the longitudinal axis and received in one of the first and second groove sections. A driving device is received in the inner spindle. The cylindrical lock has two modes corresponding to selective use of the first and second actuating members to provide locking/unlocking states through supply or not supply of electricity to the driving device.

9 Claims, 24 Drawing Sheets

CYLINDRICAL LOCK WITH AUTOMATIC ELECTRONIC LOCKING FUNCTION

BACKGROUND OF THE INVENTION

The present invention relates to a cylindrical lock with automatic electronic locking function and, more particularly, to a cylindrical lock that can cooperate with a burglarproof system and a remote control device to proceed with locking/unlocking operation and that can be converted between differing types through simple replacement or adding/removal of a component.

There is a wide variety of locks having differing structures to provide different functions for different locations and to provide various options for the users. Cylindrical locks also have many types, such as cylindrical locks with a freely rotatable outer handle when in a locked state and cylindrical locks that can be remotely locked/unlocked by a remote control. The components of a type of the cylindrical lock are often different from those of another type in structure and are, thus, not interchangeable, even though the cylindrical locks are manufactured by the same manufacturer. Thus, the manufacturer has to prepare many spare components for various cylindrical locks. Furthermore, the assembling procedures and/or assembling techniques of the various cylindrical locks are different, leading to low yield.

Thus, a need exists for a cylindrical lock that can cooperate with a burglarproof system and a remote control device to proceed with locking/unlocking operation and that can be converted between differing types through simple replacement or adding/removal of a component.

BRIEF SUMMARY OF THE INVENTION

The present invention solves this need and other problems in the field of reducing inventory of lock components by providing, in a preferred form, a cylindrical lock including an outer chassis having first and second portions spaced along a longitudinal axis. A receiving space extends from an end face of the first portion towards but spaced from an end face of the second portion along the longitudinal axis. A pivotal space extends from the end face of the second portion through the receiving space along the longitudinal axis. The outer chassis is adapted to be mounted in a mounting space of a door. An outer spindle is rotatably received in the pivotal space of the outer chassis. The outer spindle includes first and second ends spaced along the longitudinal axis. A passageway extends from the first end of the outer spindle towards but spaced from the second end of the outer spindle along the longitudinal axis. The first end of the outer spindle faces the receiving space of the outer chassis. The second end of the outer spindle is located outside of the outer chassis.

The cylindrical lock further includes a first actuating member having first and second ends spaced along the longitudinal axis. A space extends from the first end of the first actuating member towards but spaced from the second end of the first actuating member along the longitudinal axis. A limiting groove extends from an end face of the first end of the first actuating member towards but spaced from the second end of the first actuating member along the longitudinal axis and in communication with the space of the first actuating member. The limiting groove of the first actuating member includes first and second groove sections in communication with each other. Each of the first and second groove sections of the first actuating member extends in a circumferential direction about the longitudinal axis. The first groove section has a first arc in the circumferential direction. The second groove section has a second arc in the circumferential direction larger than the first arc. The first actuating member further includes a lug spaced from the limiting groove of the first actuating member in a radial direction perpendicular to the longitudinal axis.

The cylindrical lock further includes a second actuating member rotatably received in the outer spindle and having first and second ends spaced along the longitudinal axis. A space extends from the first end of the second actuating member towards but spaced from the second end of the second actuating member along the longitudinal axis. A limiting groove extends from an end face of the first end of the second actuating member towards but spaced from the second end of the second actuating member along the longitudinal axis and in communication with the space of the second actuating member. The limiting groove of the second actuating member includes first and second groove sections in communication with each other. Each of the first and second groove sections of the second actuating member extends in the circumferential direction about the longitudinal axis. The first groove section has a third are in the circumferential direction. The second groove section has a fourth arc in the circumferential direction smaller than the third arc. The second actuating member further includes a lug spaced from the limiting groove of the second actuating member in a radial direction perpendicular to the longitudinal axis.

One of the first and second actuating members is selectively and rotatably received in the outer spindle with the limiting groove aligned with the passageway of the outer spindle and with the lug located outside of the outer spindle and received in the receiving space of the outer chassis.

The cylindrical lock further includes a driving member rotatably received in the space of one of the first and second actuating members. The driving member includes a pivotal portion and a leg extending from the pivotal portion in a direction perpendicular to the longitudinal axis. The leg extends through the limiting groove of one of the first and second actuating members and through the passageway of the outer spindle. The leg is movable in the passageway along the longitudinal axis between first and second positions. The leg in the first position is received in the first groove section. The leg in the second position is received in the second groove section.

The cylindrical lock further includes an outer handle connected to the second end of the outer spindle to rotate therewith. A retractor is received in the receiving space of the outer chassis and operatively coupled to the lug of one of the first and second actuating members. The retractor is movable between third and fourth positions in a direction perpendicular to the longitudinal axis. A latch bolt is operatively connected to the retractor and movable between a latching position outside of the door and an unlatching position inside the door.

The cylindrical lock further includes an inner chassis engaged with the outer chassis and facing the receiving space. The inner chassis includes first and second ends spaced along the longitudinal axis. A mounting hole extends from the second end of the inner chassis through the first end of the inner chassis along the longitudinal axis. The inner chassis is adapted to be mounted in the mounting space of the door.

The cylindrical lock further includes an inner spindle rotatably received in the mounting hole of the inner chassis. The inner spindle includes first and second ends spaced along the longitudinal axis. The first end of the inner spindle is connected to the retractor to move therewith. The second end of the inner spindle is located outside of the inner chassis. The retractor is movable between the third and fourth positions when the inner spindle rotates.

The cylindrical lock further includes a driving device received in the inner spindle. The driving device is adapted to be electrically connected to a power supply. The cylindrical lock includes first and second modes. The first actuating member is assembled in the outer spindle when the cylindrical lock is in the first mode. The second actuating member is assembled in the outer spindle when the cylindrical lock is in the second mode. The cylindrical lock in the first mode is in a locking state when the driving device is not supplied with electricity and is in an unlocking state when the driving device is supplied with electricity. The cylindrical lock in the second mode is in an unlocking state when the driving device is not supplied with electricity and is in a locking state when the driving device is supplied with electricity.

The cylindrical lock further includes a sliding rod received in the driving device and slideable along the longitudinal axis. The sliding rod includes a coupling end securely connected to the driving member. The driving member is in the first position when the driving device is not supplied with electricity from the power supply. The driving member moves from the first position to the second position together with the sliding rod when the driving device is supplied with electricity from the power supply. An inner handle is connected to the second end of the inner spindle to rotate therewith.

When the first actuating member is assembled in the outer spindle and when the driving member is in the first position with the leg received in the first groove section of the first actuating member, rotation of the outer handle causes rotation of the leg of the driving member in the first groove section of the first actuating member without moving the first actuating member and the latch bolt.

When the first actuating member is assembled in the outer spindle and when the driving member is in the second position with the leg received in the second groove section of the first actuating member, rotation of the outer handle causes joint rotation of the driving member and the first actuating member, moving the latch bolt from the latching position to the unlatching position.

When the second actuating member is assembled in the outer spindle and when the driving member is in the second position with the leg received in the second groove section of the second actuating member, rotation of the outer handle causes rotation of the leg of the driving member in the first groove section of the second actuating member without moving the second actuating member and the latch bolt.

When the second actuating member is assembled in the outer spindle and when the driving member is in the first position with the leg received in the second groove section of the second actuating member, rotation of the outer handle causes joint rotation of the driving member and the second actuating member, moving the latch bolt from the latching position to the unlatching position.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
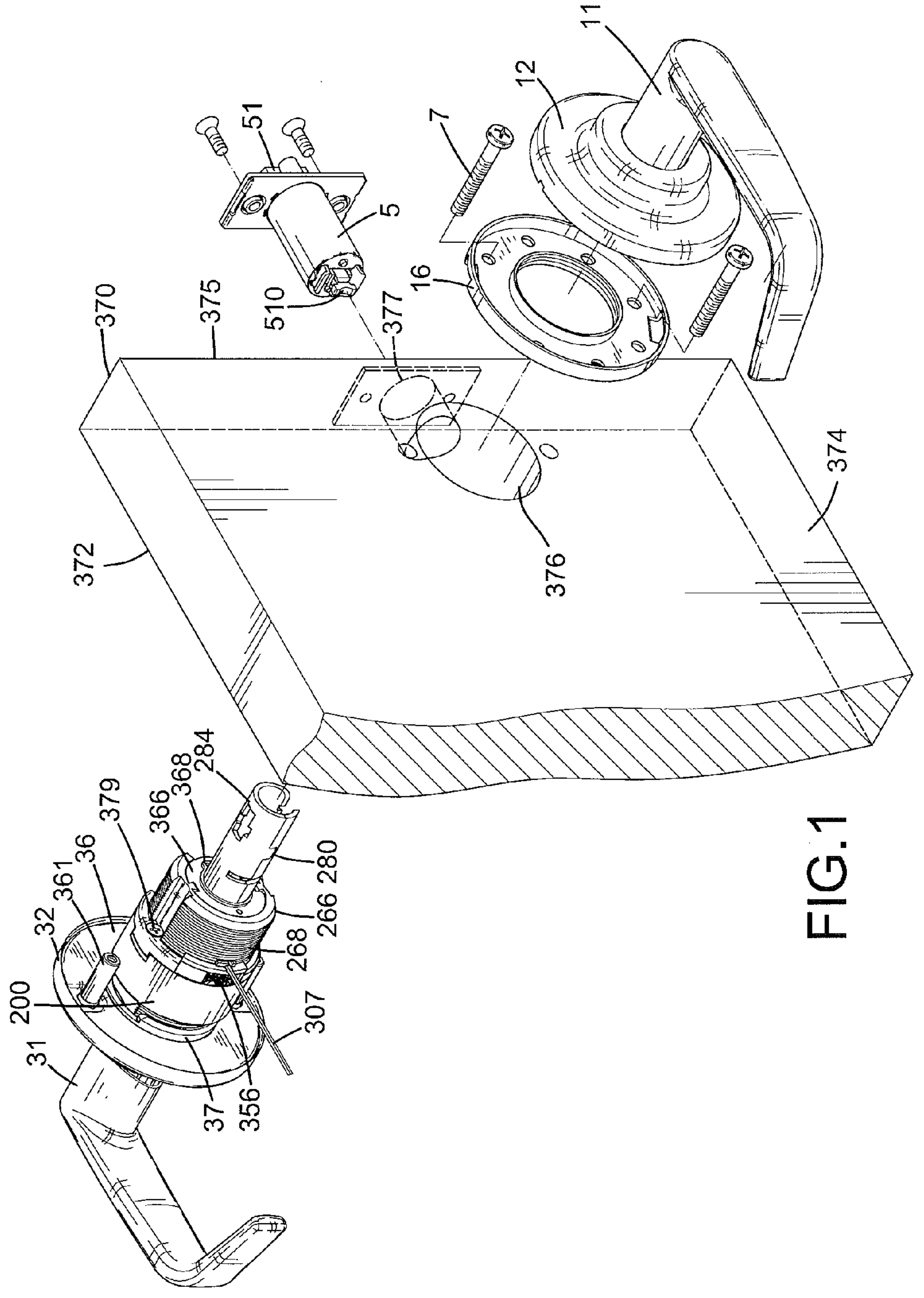
FIG. 1 shows an exploded, perspective view of a portion of a door and a cylindrical lock of a first embodiment according to the present invention.
Figure 2:
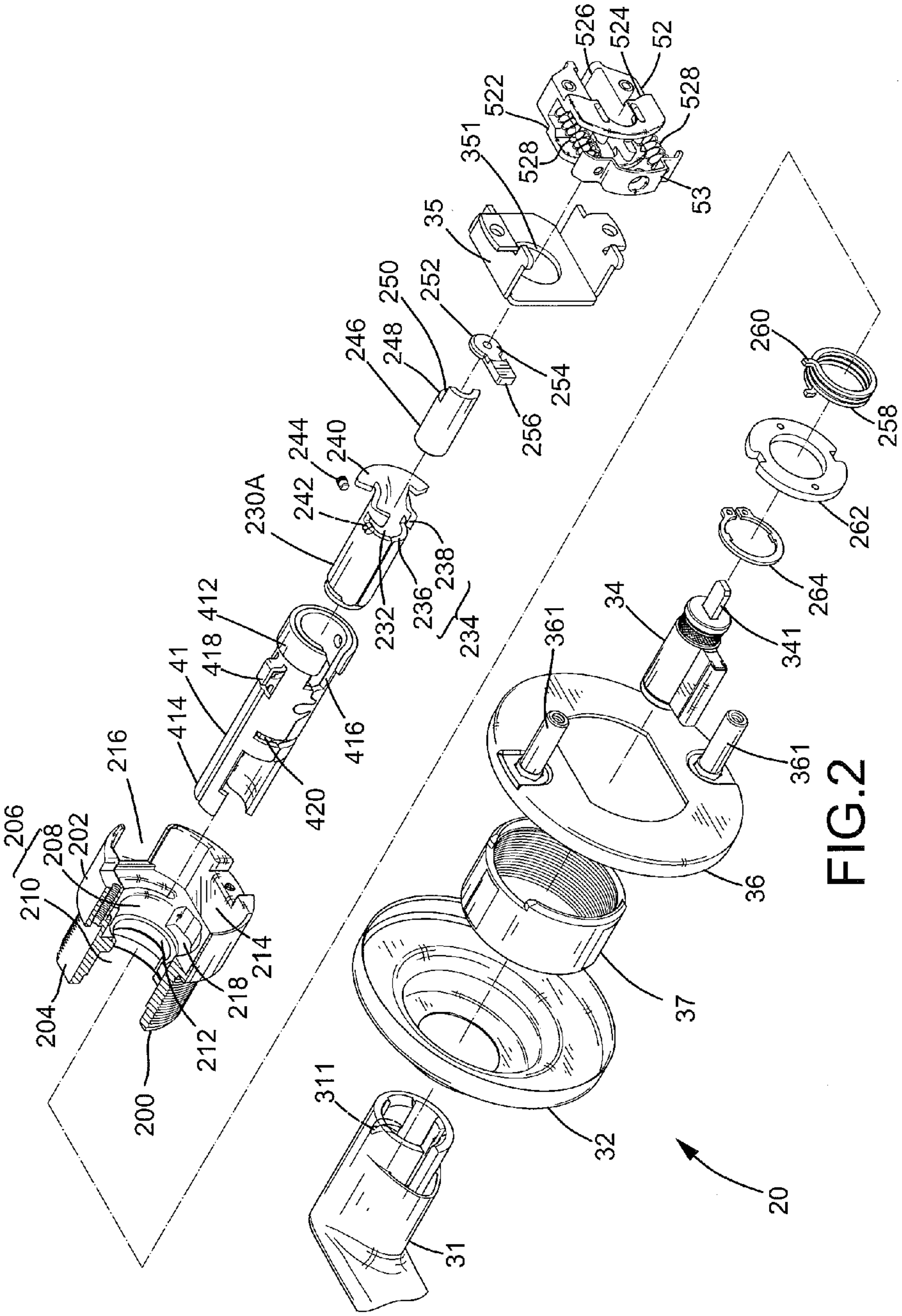
FIG. 2 shows an exploded, perspective view of an outer operational device of the cylindrical lock of FIG. 1.
Figure 3:
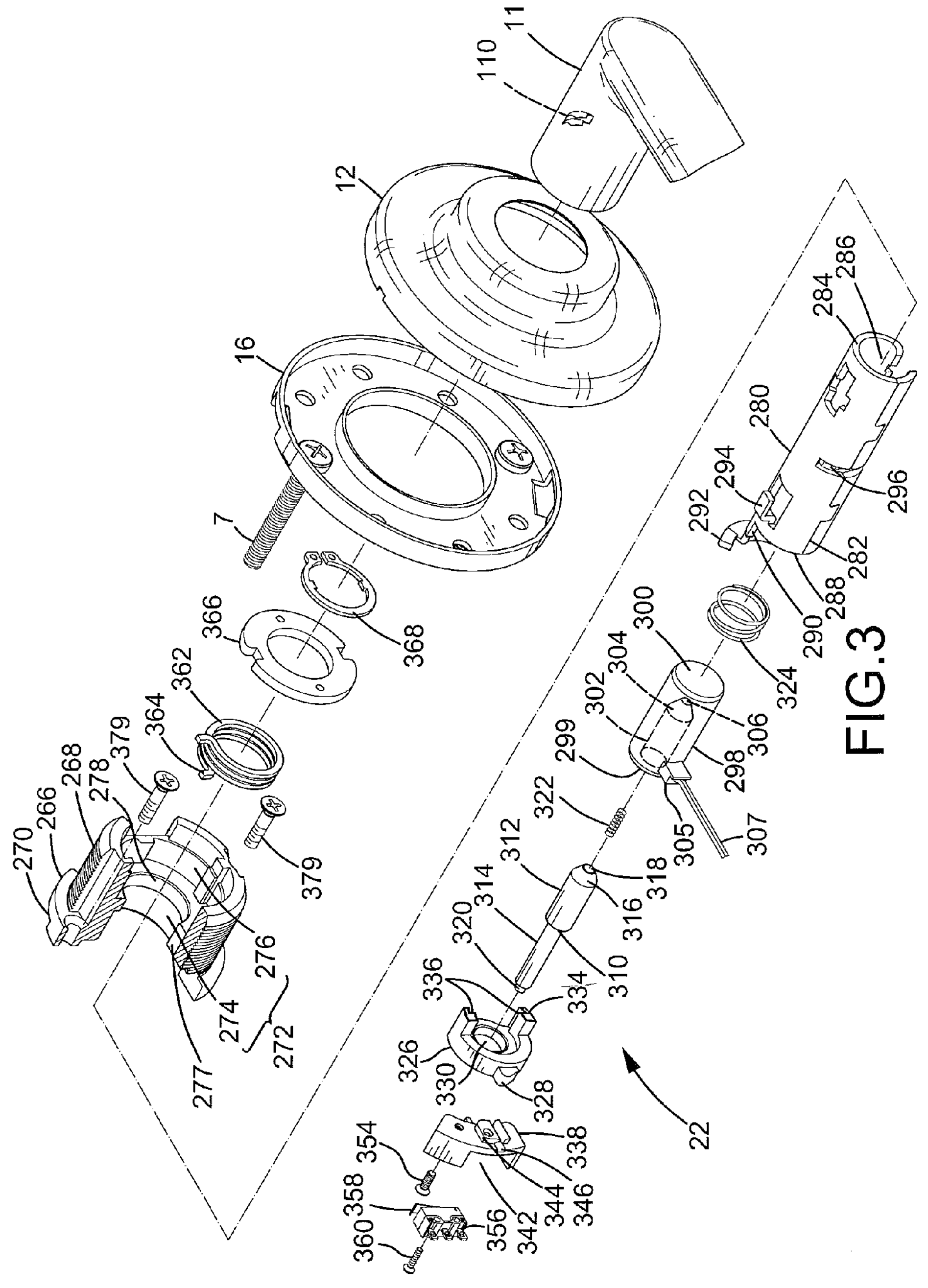
FIG. 3 shows an exploded, perspective view of an inner operational device of FIG. 1.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms “first”, “second”, “third”, “fourth”, “inner”, “outer”, “side”, “end”, “portion”, “section”, “longitudinal”, “radial”, “circumferential”, “lateral”, “horizontal”, “annular", "outward", "spacing", "length", "width", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

A cylindrical lock 10 of a first embodiment according to the present invention is shown in FIGS. 1-13 and includes an outer chassis 200 having first and second portions 202 and 204 spaced along a longitudinal axis. Each of first and second portions 202 and 204 has an end face. A receiving space 214 extends along the longitudinal axis from the end face of first portion 202 towards but spaced from the end face of second portion 204. A notch 216 extends in a radial direction perpendicular to the longitudinal axis from an outer periphery of first portion 202 through receiving space 214. A pivotal space 206 extends along the longitudinal axis from the end face of second portion 204 through receiving space 214. Pivotal section 206 includes first and second sections 208 and 210 with an inner flange 212 located intermediate first and second sections 208 and 210. First section 208 is in communication with receiving space 214. A groove 218 is formed in an inner periphery of first section 208 and substantially C-shaped in cross section.

Cylindrical lock 10 further includes an outer spindle 41 having first and second ends 412 and 414 spaced along the longitudinal axis. First end 412 has an outer diameter larger than second end 414, forming a stepped portion. A passageway 416 extends from an end face of first end 412 towards but spaced from second end 414. Outer spindle 41 further includes a protrusion 418 extending from an outer periphery of first end 412. An outer engaging plate 420 is received in outer spindle 41 and positioned by elasticity. An end of outer engaging plate 420 is located outside of outer spindle 41. Outer spindle 41 is rotatably received in pivotal space 206 of outer chassis 200 with an outer periphery of outer spindle 41 abutting inner flange 212. Specifically, first end 412 of outer spindle 41 is received in first section 208 of pivotal space 206. The outer periphery of first end 412 of outer spindle 41 rotatably abuts the inner periphery of first section 208 of pivotal space 206. The stepped portion at first end 412 of outer spindle 41 rotatably abuts an end face of inner flange 212. Passageway 416 of outer spindle 41 is aligned with groove 218. Second end 414 of outer spindle 41 is located outside of outer chassis 200. Protrusion 418 of outer spindle 41 is received in second section 210 of pivotal space 206.

Cylindrical lock 10 further includes an outer spring 258, an outer cover 262, and an outer retainer ring 264. Outer spring 258 is in the form of a torsion spring having two tangs 260. Outer spring 258 is mounted around outer spindle 41 and located in second section 210 of pivotal space 206 with tangs 260 located on opposite sides of protrusion 418 of outer spindle 41 and with tangs 260 engaged with the inner periphery of second section 210 of pivotal space 206 such that one of tangs 260 is pivoted and the other tang 260 is not moved when outer spindle 41 is rotated, providing elasticity for returning outer spindle 41. Outer cover 262 is mounted around outer spindle 41 and closes an end opening of second section 210, preventing outer spring 258 from disengaging from second section 210 of pivotal space 206. Outer retainer ring 264 is mounted to the outer periphery of outer spindle 41 and located outside of outer chassis 200. Outer retainer ring 264 abuts an outer face of outer cover 262. Furthermore, first end 412 of outer spindle 41 abuts inner flange 212 of outer chassis 200. Thus, outer spindle 41 can not move relative to outer chassis 200 along the longitudinal axis.

Cylindrical lock 10 further includes an actuating member 230A rotatably received in outer spindle 41. A space 232 extends from a first end of actuating member 230A along the longitudinal axis towards but spaced from a second end of actuating member 230A. A limiting groove 234 extends from an end face of the first end of actuating member 230A towards but spaced from the second end of actuating member 230A along the longitudinal axis and is in communication with space 232. Limiting groove 234 has first and second groove sections 236 and 238 extending in a circumferential direction about the longitudinal axis. First and second groove sections 236 and 238 are in communication with each other. An arc of first groove section 236 in the circumferential direction is larger than that of second groove section 238. Actuating member 230A further includes a sector-shaped lug 240 extending outward from the first end of actuating member 230A and extending in the circumferential direction. Furthermore, an engaging hole 242 extends from an outer periphery of actuating member 230A in a radial direction perpendicular to the longitudinal axis through space 232. A follower pin 244 is securely received in engaging hole 242 and has an end located in space 232. Limiting groove 234 of actuating member 230A is aligned with passageway 416 of outer spindle 41. Lug 240 is located outside of outer spindle 41 and received in receiving space 214 of outer chassis 200.

Cylindrical lock 10 further includes a follower 246 having a recessed portion 248 in an end thereof. Recessed portion 248 includes two abutment walls 250. Follower 246 is rotatably received in space 232 of actuating member 230A with recessed portion 248 aligned with follower pin 244 and with follower pin 244 located between abutment walls 250.

Cylindrical lock 10 further includes a driving member 252. Driving member 252 has a pivotal portion 254 and a leg 256 extending from a periphery of pivotal portion 254 in a direction perpendicular to the longitudinal axis. Driving member 252 is received in space 232 of actuating member 230A with leg 256 extending through passageway 416 of outer spindle 41 and limiting groove 234 of actuating member 230A. A distal end of leg 256 is located in groove 218 of outer chassis 200. Driving member 252 can move in a length extent of passageway 416 of outer spindle 41 along the longitudinal axis between first and second positions. Leg 256 has a width smaller than an arc of first groove section 236 of actuating member 230A in the circumferential direction. Furthermore, the width of leg 256 is only slightly smaller than an arc of second groove section 238 of actuating member 230A in the circumferential direction. When driving member 252 is in the first position (FIG. 5), leg 256 is in first groove section 236 of limiting groove 234 and pivotable in the extent of the arc of the first groove section 236. On the other hand, when driving member 252 is in the second position (FIG. 9), leg 256 is limited in second groove section 238 and, thus, can not pivot relative to actuating member 230A.

Cylindrical lock 10 further includes a partitioning plate 35, a retractor 52, a positioning plate 53, and two springs 528. Partitioning plate 35 has two sides spaced along the longitudinal axis and a through-hole 351 extending from a side through the other side of partitioning plate 35. Retractor 52 has first and second actuation walls 522 and 524 spaced along the longitudinal axis and a connecting end 526 between first and second actuation walls 522 and 524. Partitioning plate 35 is received in receiving space 214 with a side of partitioning plate 35 abutting an end wall of receiving space 214 and with through-hole 351 aligned with pivotal space 206 of outer chassis 200. Retractor 52 is movably received in receiving space 214 of outer chassis 200. First actuation wall 522 faces partitioning plate 35. Connecting end 526 of retractor 52 is aligned with notch 216 of outer chassis 200. Springs 528 are mounted between positioning plate 53 and retractor 52. Specifically, each spring 528 has an end fixed to positioning plate 53. The other end of each spring 528 abuts against retractor 52. Lug 240 of actuating member 230A engages with first actuation wall 522 of retractor 52. Retractor 52 is movable in a direction perpendicular to the longitudinal axis between a third position (FIG. 5) close to notch 216 and a fourth position (FIG. 11) away from notch 216. Springs 528 bias retractor 52 from the fourth position to the third position.

Cylindrical lock 10 further includes an inner chassis 266 engaged with outer chassis 200. Inner chassis 266 includes first and second ends spaced along the longitudinal axis and respectively having an engaging portion 268 and a flange 270 spaced along the longitudinal axis. A mounting hole 272 extends from the second end through the first end of inner chassis 266. Mounting hole 272 includes a first section 274 adjacent flange 270, a second section 276 adjacent engaging portion 268, and an inner flange 278 located intermediate first and second sections 274 and 276. A fixing groove 277 is formed in an inner periphery of inner flange 278 and extends along the longitudinal axis. A sector-shaped insertion groove 283 is formed in a surface of flange 270 facing outer chassis 200. Insertion groove 283 has a screw hole 285 in a bottom face thereof. The surface of the flange 270 further includes a restraining groove 279 that is C-shaped in cross section. Restraining groove 279 includes two restraining walls 281 spaced in a circumferential direction about the longitudinal axis. Restraining groove 279 is in communication with first section 274 of mounting hole 272 and insertion groove 283.

Cylindrical lock 10 further includes an inner spindle 280 rotatably received in mounting hole 272 of inner chassis 266. Inner spindle 280 includes first and second ends 282 and 284 spaced along the longitudinal axis. First end 282 includes an end face 288. A receiving hole 286 extends from first end 282 through second end 284 along the longitudinal axis. An extension section extends from end face 288 away from second end 284 along the longitudinal axis and has two engaging faces 290. A sector-shaped ear 292 extends from the extension section in the circumferential direction about the longitudinal axis. A protrusion 294 is formed on an outer periphery of inner spindle 280 and located adjacent to first end 282. An inner engaging plate 296 is received in inner spindle 280 and positioned by elasticity. An end of inner engaging plate 296 is located outside of inner spindle 280. First end 282 of inner spindle 280 is received in inner flange 278 of mounting hole 272. Ear 292 is located beyond flange 270 of inner chassis 266. Furthermore, ear 292 engages with second actuation wall 524 of retractor 52 to move therewith. Protrusion 294 of inner spindle 280 is located in second section 276 of mounting hole 272 of inner chassis 266. Second end 284 of inner spindle 280 is outside of inner chassis 266.

Cylindrical lock 10 further includes an inner spring 362, an inner cover 366, and an inner retainer ring 368. Inner spring 362 is in the form of a torsion spring and has two tangs 364. Inner spring 362 is mounted around inner spindle 280 and located in second section 276 of mounting hole 272 of inner chassis 266. Tangs 364 of inner spring 362 are engaged with the inner periphery of second section 276 of mounting hole 272 such that one of tangs 364 is pivoted and the other tang 364 is not moved when inner spindle 280 is rotated, providing elasticity for returning inner spindle 280. Inner cover 366 is mounted around inner spindle 280 and closes an end opening of second section 276 of mounting hole 272, preventing inner spring 362 from disengaging from second section 276 of mounting hole 272. Inner retainer ring 368 is mounted to the outer periphery of inner spindle 280 and located outside of inner chassis 266. Inner retainer ring 368 abuts an outer face of inner cover 366. Furthermore, ear 292 of inner spindle 280 abuts flange 270. Thus, inner spindle 280 can not move relative to inner chassis 266 along the longitudinal axis.

Cylindrical lock 10 further includes a driving device 298 formed by an electromagnetic magnet or solenoid. Driving device 298 is received in receiving hole 286 of inner spindle 280. Driving device 298 includes first and second ends 299 and 300 spaced along the longitudinal axis. A wire guide 305 extends from an outer periphery of driving device 298 and located adjacent to first ends 299. Driving device 298 includes a wire 307 extending outward through wire guide 305. A sliding hole 302 extends from first end 299 towards but spaced from second end 300 of driving device 298. Sliding hole 302 has a bottom face 306 and a conical portion 304 adjacent bottom face 306.

Figure 4:
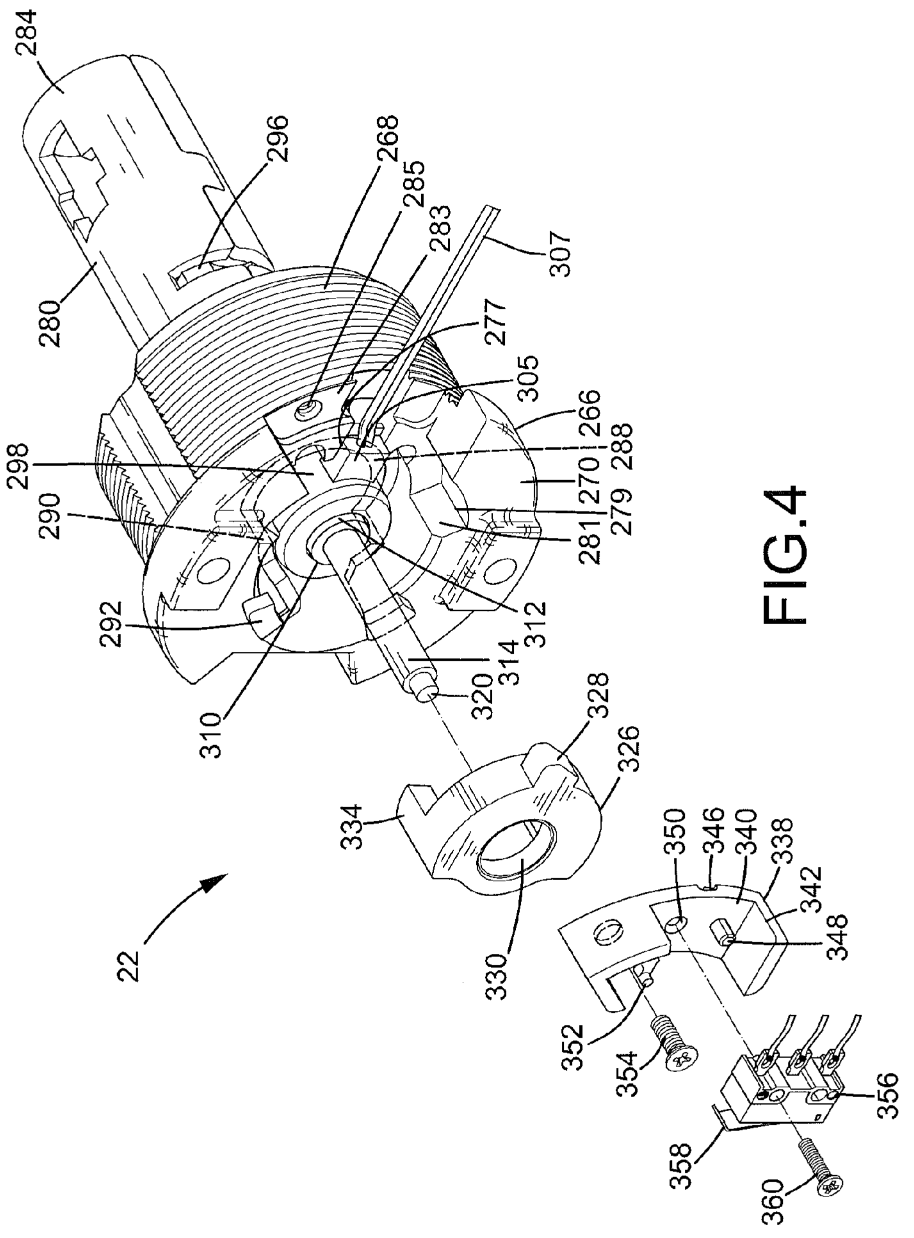
FIG. 4 shows a partial, exploded, perspective view of the inner operational device of FIG. 3.
Figure 5:
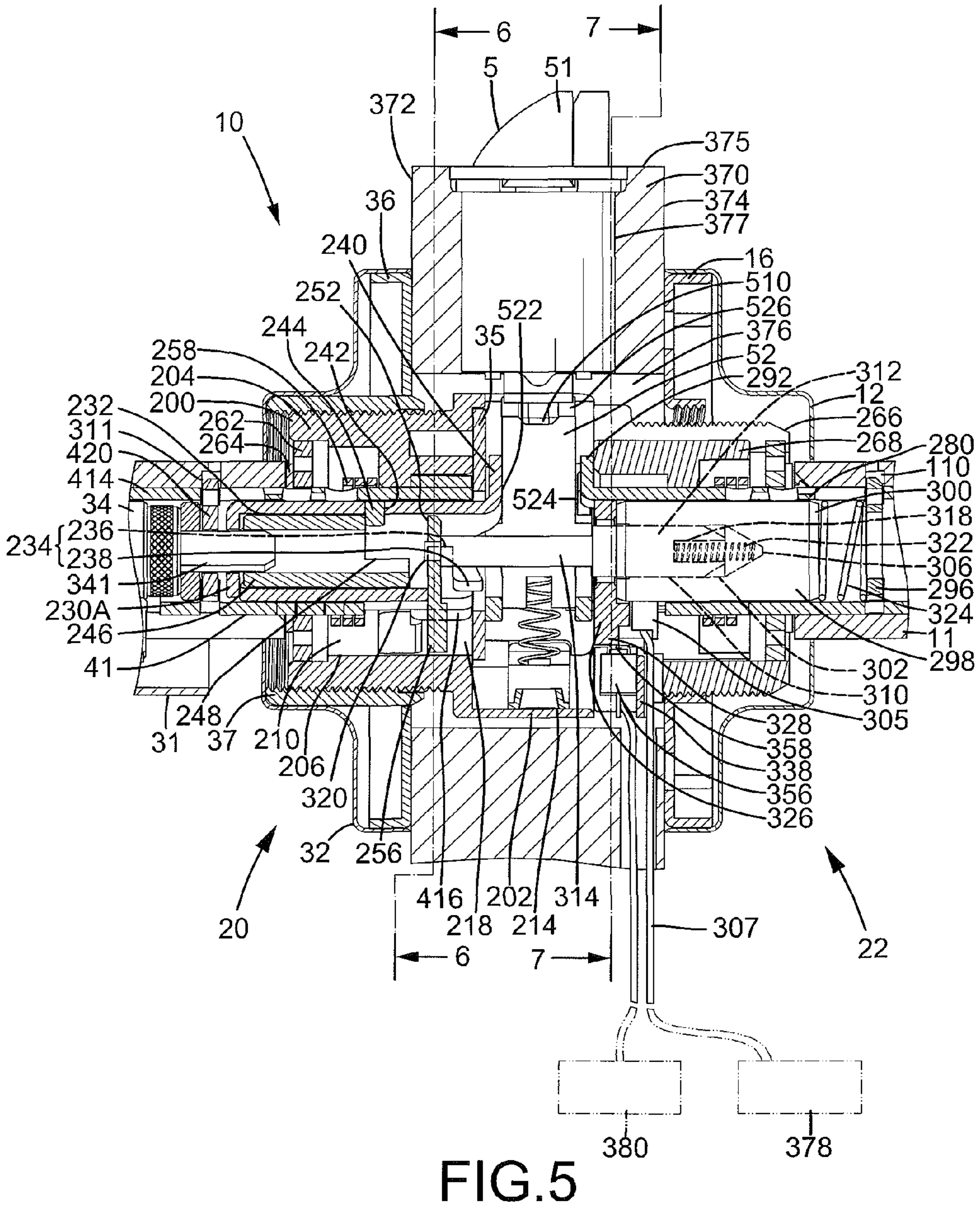
FIG. 5 shows a cross sectional view of the cylindrical lock of FIG. 1.

A sliding rod 310 includes a follower portion 312 and an extension 314 having an outer diameter smaller than follower portion 312. Extension 314 has a coupling end 320. Follower portion 312 includes a conical section 316 having a receptacle 318 extending along the longitudinal axis. Follower portion 312 of sliding rod 310 is slideably received in sliding hole 302 of driving device 298. A section of follower portion 312 adjacent to extension 314 is located outside of driving device 298. A spring 322 is mounted between bottom face 306 of driving device 298 and follower portion 312. Specifically, an end of spring 322 is received in receptacle 318 of sliding rod 310, and the other end of spring 322 abuts bottom face 306 of sliding hole 302, resiliently supporting sliding rod 310. Driving device 298 is rotatably received in receiving hole 286 of inner spindle 280. First end 299 and wire guide 305 of driving device 298 are located outside of end face 288 of inner spindle 280. A spring 324 is mounted between driving device 298 and inner engaging plate 296. Specifically, an end of spring 324 abuts inner engaging plate 296, and the other end of spring 324 abuts second end 300 of driving device 298, resiliently supporting driving device 298. Wire guide 305 of driving device 298 is engaged in fixing groove 277 of inner chassis 266 (FIG. 4). Wire 307 of driving device 298 extends out of inner chassis 266 via insertion groove 283 and is electrically connected to a power supply 378. A remote control can be utilized to control supply of electricity from power supply 378 to driving device 298.

Cylindrical lock 10 further includes a pressing member 326 received in first section 274 of inner chassis 266. Pressing member 326 includes a pressing block 328 extending radially from an outer periphery of pressing member 326 in a radial direction perpendicular to the longitudinal axis. A through-hole 330 extends from a first side of pressing member 326 through a second side of pressing member 326 along the longitudinal axis. Two arms 334 extend from the first side of pressing member 326 along the longitudinal axis. Each arm 334 has a distal end with an abutment face 336. Pressing member 326 is mounted around follower portion 312 of sliding rod 310 and located adjacent to extension 314 of sliding rod 310. Abutment faces 336 of pressing member 326 respectively engage with engaging faces 290 of inner spindle 280, allowing joint rotation of pressing member 326 and inner spindle 280.

Cylindrical lock 10 further includes a seat 338 mounted in insertion groove 283 of inner chassis 266. Seat 338 includes a fixing wall 340 having first and second faces spaced along the longitudinal axis. A through-hole 351 extends from the first face through the second face of fixing wall 340. A coupling portion 344 is formed on the first face of fixing wall 340.

Coupling portion 344 includes first and second lateral surfaces spaced along an axis perpendicular to the longitudinal axis. A wire groove 346 extends from the first lateral surface through the second lateral surface of coupling portion 344. Seat 338 further includes a positioning peg 348 formed on the second face of fixing wall 340. Furthermore, a restraining peg 352 is formed on a lateral side of seat 338. Further, a notch 342 is formed in the other lateral side of seat 338 and located adjacent to positioning peg 348. Seat 338 is received in insertion groove 283 of inner chassis 266. A fastener 354 is extended through fixing wall 340 into screw hole 285 of inner chassis 266 to fix seat 338 in insertion groove 283 of inner chassis 266. Wire 307 of driving device 298 is retained in wire groove 346 of coupling portion 344, preventing wire 307 from being damaged due to twisting.

Cylindrical lock 10 further includes a detection member 356 such as a micro switch. Detection member 356 is mounted on seat 338 and includes a pressable pressing plate 358. Specifically, detection member 356 is fixed to fixing wall 340 of seat 338 with positioning peg 348 extending into a hole in detection member 356. A fastener 360 is extended through detection member 356 into a hole 350 of seat 338. Thus, detection member 356 is securely fixed to seat 338 with pressing plate 358 aligned with and pressed against by pressing block 328 of pressing member 326. Detection member 356 is electrically connected to a burglarproof system 380.

Cylindrical lock 10 further includes an inner handle 11, an inner escutcheon 12, and an inner fixing board 16. The inner fixing board 16 is mounted to engaging portion 268 of inner chassis 266. Inner escutcheon 12 is mounted around inner fixing board 16 to cover engaging portion 268 of inner chassis 266. Inner handle 11 includes a positioning groove 110. Inner handle 11 is mounted around second end 284 of inner spindle 280 with the end of inner engaging plate 296 extending through an end of inner spindle 280 into positioning groove 110 of inner handle 11. Thus, inner handle 11 can not move along the longitudinal axis to disengage from inner spindle 280. When inner handle 11 is rotated about the longitudinal axis, inner spindle 280 rotates together with inner handle 11 through inner engaging plate 296, forming an inner operational device 22 operated by inner handle 11.

Figure 9:
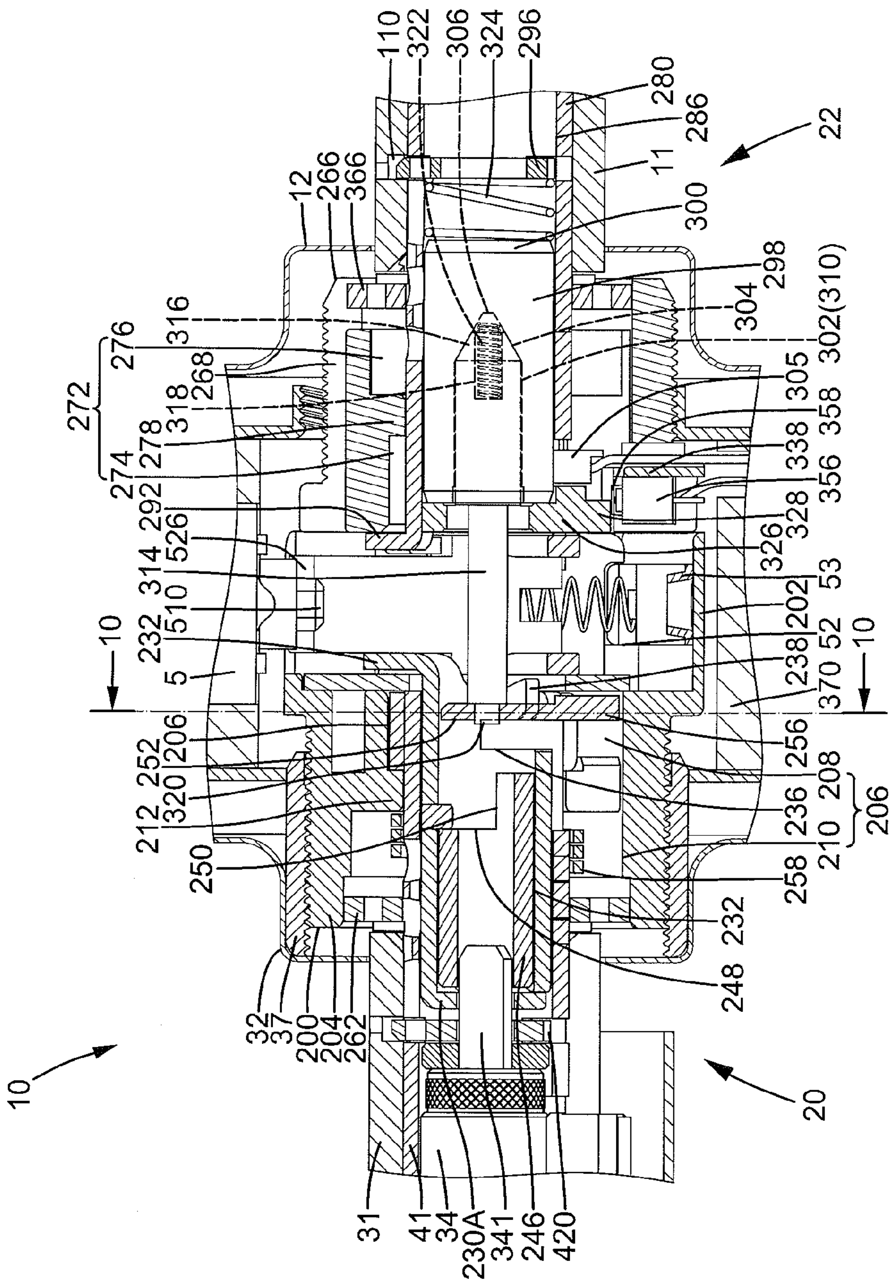
FIG. 9 shows a view similar to FIG. 5 with an actuating member moved by a sliding rod after electricity is supplied to a driving device.
Figure 10:
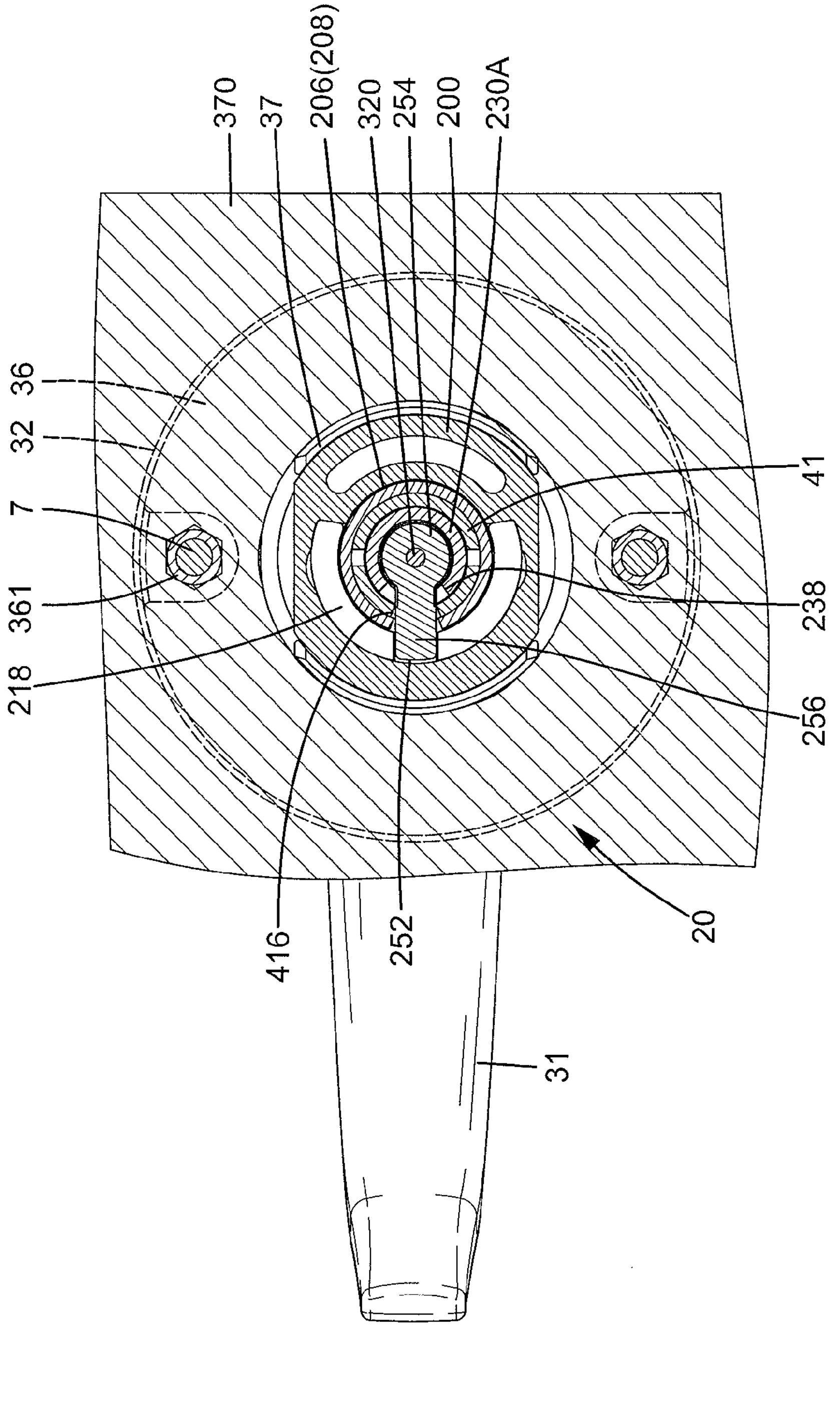
FIG. 10 shows a cross sectional view of FIG. 9 according to section line 10-10 of FIG. 9.

Flange 270 of inner chassis 266 abuts the end face of first portion 202 of outer chassis 200. Two screws 379 are extended through flange 270 of inner chassis 266 into first portion 202 of outer chassis 200, fixing inner and outer chassis 266 and 200 together. Coupling end 320 of sliding rod 310 extends into actuating member 230A and is connected to pivotal portion 254 of driving member 252. Sliding rod 310 is slideable along sliding hole 302 and drives driving member 252 to move between the first position (FIG. 5) and the second position (FIG. 9). Spring 322 biases driving member 252 from the second position to the first position when sliding rod 310 is not driven by driving device 298.

Cylindrical lock 10 is adapted to be mounted to a door 370 having inner and outer faces 374 and 372 spaced along the longitudinal axis and a lateral face 375 extending between inner and outer faces 374 and 372. Door 370 further includes a mounting space 376 extending from outer face 372 through inner face 374. Door 370 further includes a transverse hole 377 extending from lateral face 375 through mounting space 376 in a direction perpendicular to the longitudinal axis. Inner chassis 266 and outer chassis 200 of cylindrical lock 10 are mounted in mounting space 376 of door 370. Second portion 204 of outer chassis 200 extends beyond mounting space 376 and is located at an outer side of door 370. Engaging portion 268 of inner chassis 266 extends beyond mounting space 376 and is located at an inner side of door 370. Inner fixing board 16 abuts inner face 374 of door 370. Inner handle 11 is located at the inner side of door 370.

Cylindrical lock 10 further includes an outer escutcheon 32, an outer fixing board 36, and a pressing ring 37. Two mounting posts 361 extend from a side of outer escutcheon 32. Outer fixing board 36 is mounted around second portion 204 of outer chassis 200 with mounting posts 361 extending through door 370. Two screws 7 are extended through inner fixing board 16 into screw holes in mounting posts 361, fixing inner and outer fixing boards 16 and 36 to inner and outer faces 374 and 372 of door 370. Thus, inner chassis 266 and outer chassis 200 are fixed to door 370. Pressing ring 37 is threadedly engaged on second portion 204 of outer chassis 200 and presses against outer fixing board 36. Outer escutcheon 32 is mounted around outer fixing board 36. Pressing ring 37 and second portion 204 are located inside outer escutcheon 32.

Cylindrical lock 10 further includes an outer handle 31 and a lock core 34. Outer handle 31 includes a positioning hole 311. Lock core 34 includes a tail piece 341 extending along the longitudinal axis. Lock core 34 is received in outer handle 31. Outer handle 31 is mounted around second end 414 of outer spindle 41 with the end of outer engaging plate 420 engaged in positioning hole 311 of outer handle 31. Thus, outer handle 31 can not disengage from outer spindle 41 along the longitudinal axis. When outer handle 31 rotates about the longitudinal axis, outer spindle 41 rotates jointly with outer handle 31. Tail piece 341 of lock core 34 extends through actuating member 230A and is connected to follower 246 to move therewith. When lock core 34 is rotated by a key, tail piece 341 drives and rotates jointly with follower 246 about the longitudinal axis. An outer operational device 20 operated by outer handle 31 is, thus, formed.

Cylindrical lock 10 further includes a latch device 5 having a latch bolt 51 movable between a latching position outside of door 370 and an unlatching position inside of door 370. Latch device 5 further includes an engagement portion 510 at an inner end thereof. Latch device 5 is mounted in transverse hole 377 of door 370 with latch bolt 51 located outside of lateral face 375 and with engagement portion 510 extending through notch 216 of outer chassis 200 and connected to connecting end 526 of retractor 52 to move therewith.

Figure 6:
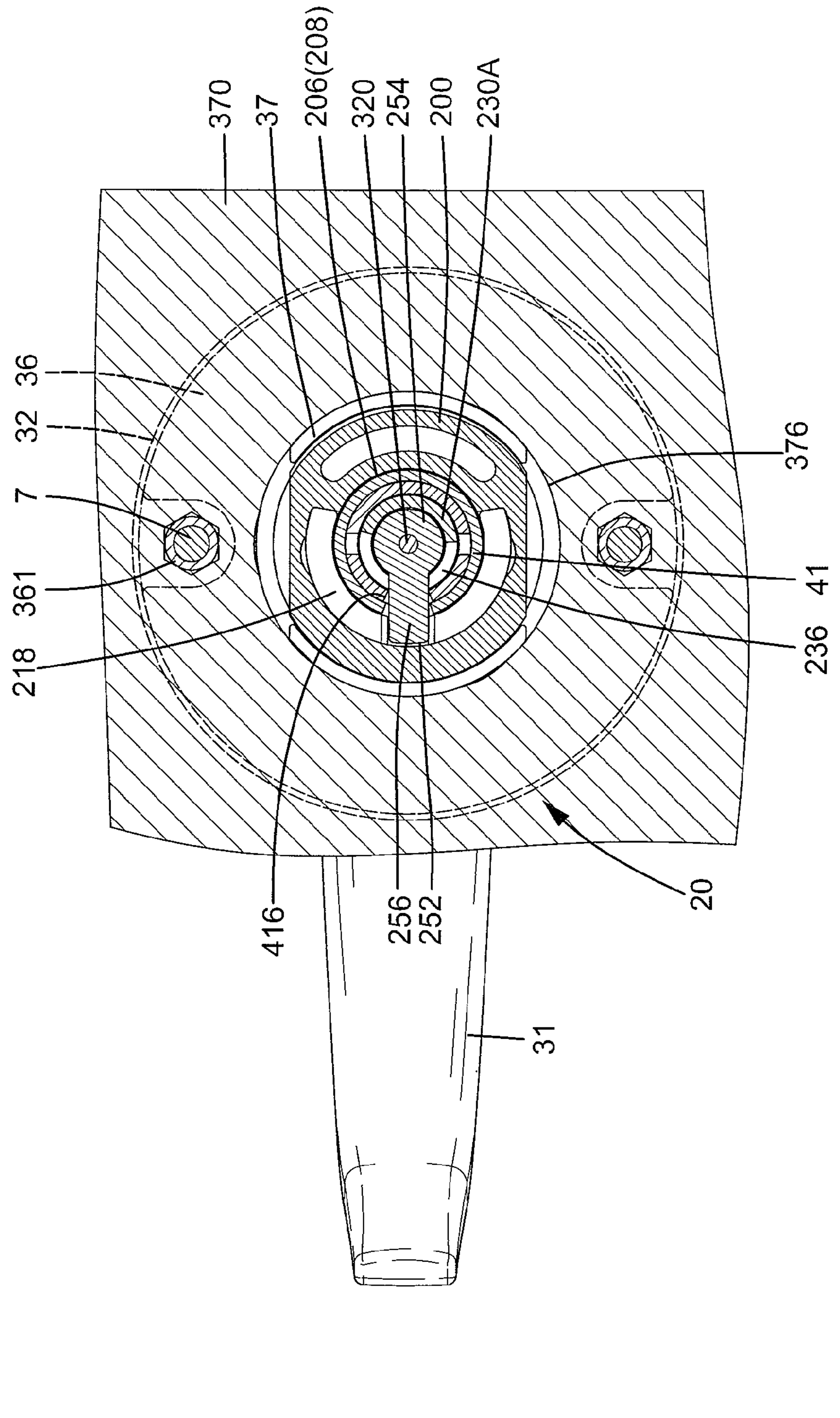
FIG. 6 shows a cross sectional view of the cylindrical lock of FIG. 1 according to section line 6-6 of FIG. 5.
Figure 7:
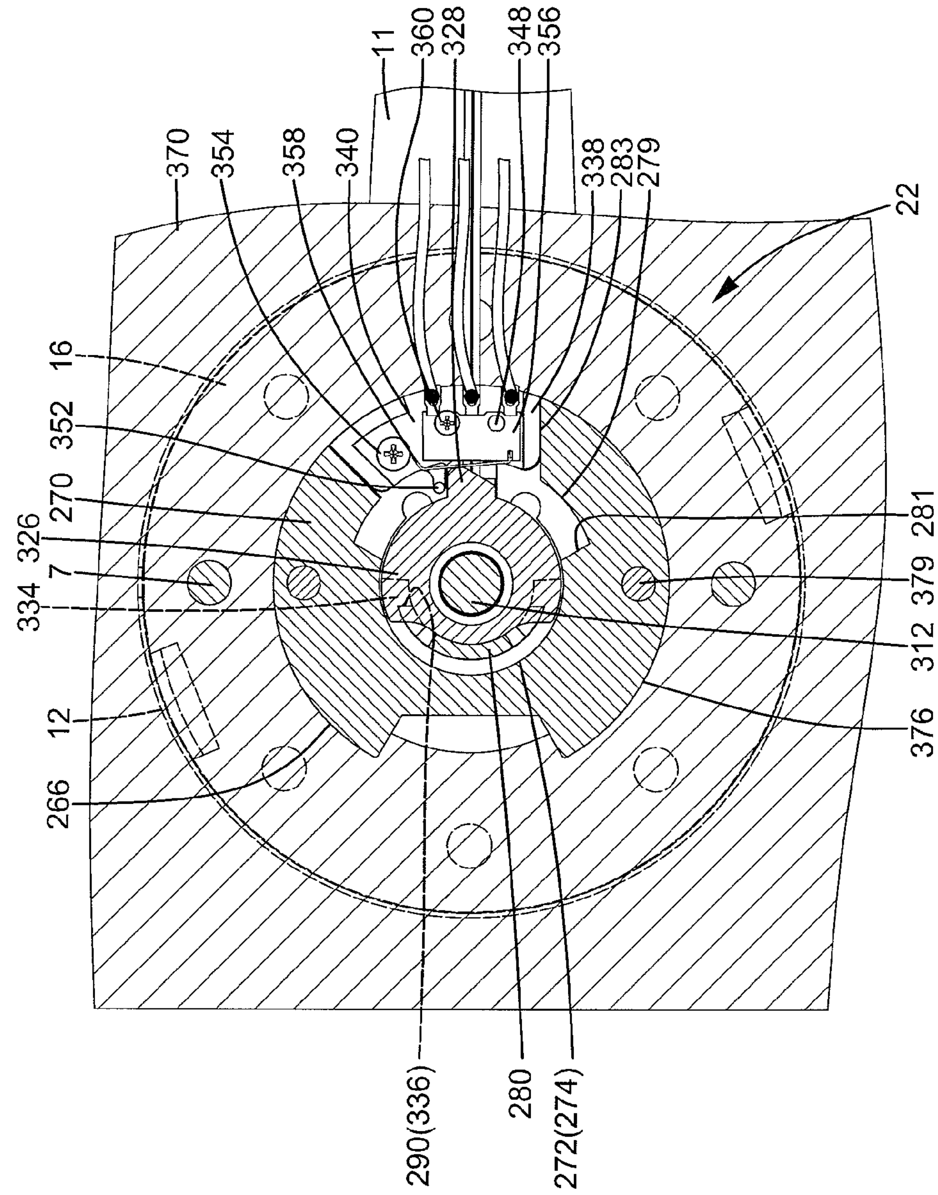
FIG. 7 shows a cross sectional view of the cylindrical lock of FIG. 1 according to section line 7-7 of FIG. 5.

Now that the basic construction of cylindrical lock 10 of the first embodiment of the present invention has been explained, the operation and some of the advantages of cylindrical lock 10 can be set forth and appreciated. In particular, for the sake of explanation, it will be assumed that door 370 is in a closed state, and cylindrical lock 10 is not operated (FIG. 5) with inner and outer handles 11 and 31 in horizontal positions (FIG. 6). Retractor 52 is in the third position with latch bolt 51 in the latching position. Power supply 378 has not supplied driving device 298 with electricity yet. Sliding rod 310 is biased by spring 322 and brings driving member 252 to the first position. Leg 256 of driving member 252 is received in first groove section 236. Burglarproof system 380 is activated. Pressing block 328 of pressing member 326 presses against pressing plate 358 of detection member 356 (FIG. 7).

Figure 8:
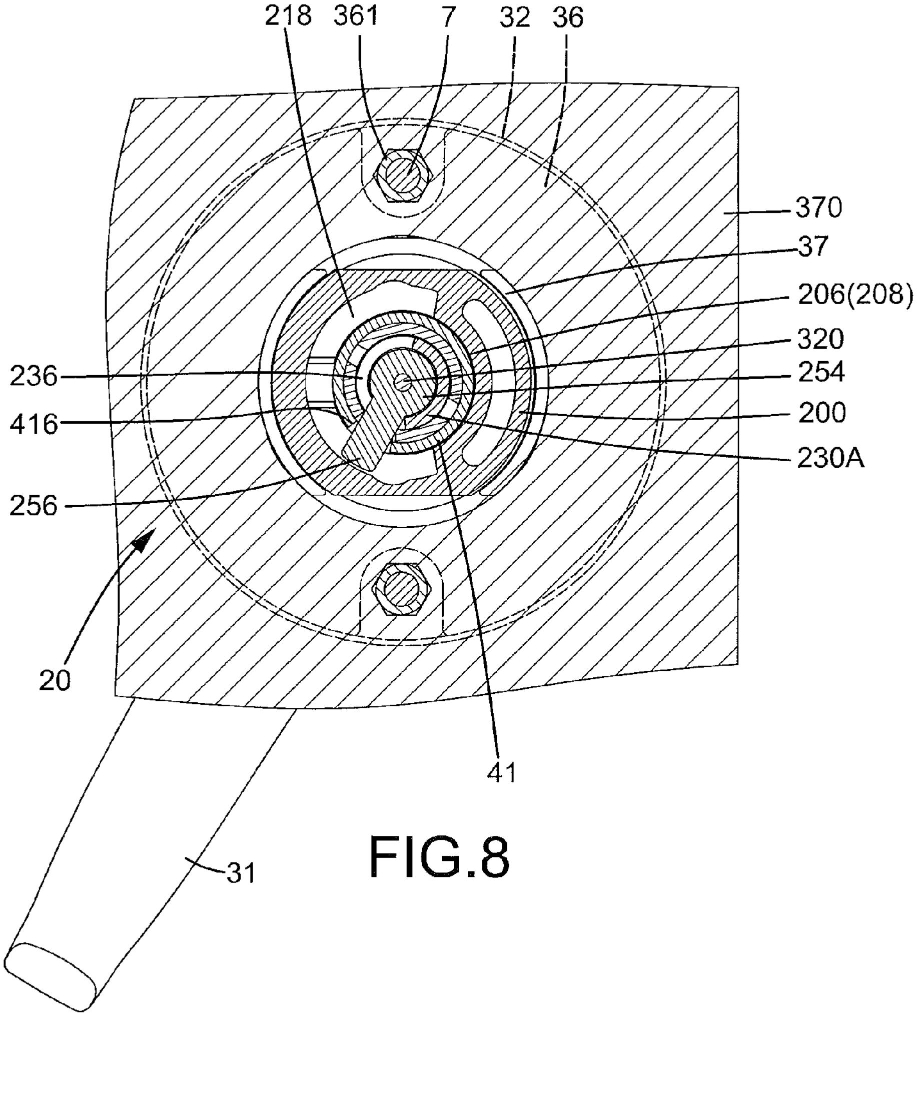
FIG. 8 shows a view similar to FIG. 6 with an outer handle rotated through an angle.

Since the arc of first groove section 236 in the circumferential direction is larger than the rotatable angle (about 45° to the horizontal position) of outer handle 31 and outer spindle 41, driving member 252 can only rotate in first groove section 236 without driving actuating member 230A when driving member 252 rotates (FIG. 8). Since actuating member 230A is not rotated, retractor 52 is biased by springs 528 to be in the third position adjacent notch 216 of outer chassis 200. Latch bolt 51 of latch device 5 remains in the latching position.

Cylindrical lock 10 is assembled in a manner that cylindrical lock 10 is in a locking state when driving device 298 is not supplied with electricity. In this state, rotation of outer handle 31 is free rotation without driving actuating member 230A. Furthermore, outer spring 258 is twisted when outer spindle 41 is rotated by outer handle 31, providing returning function for outer handle 31 when outer handle 31 is released.

Figure 11:
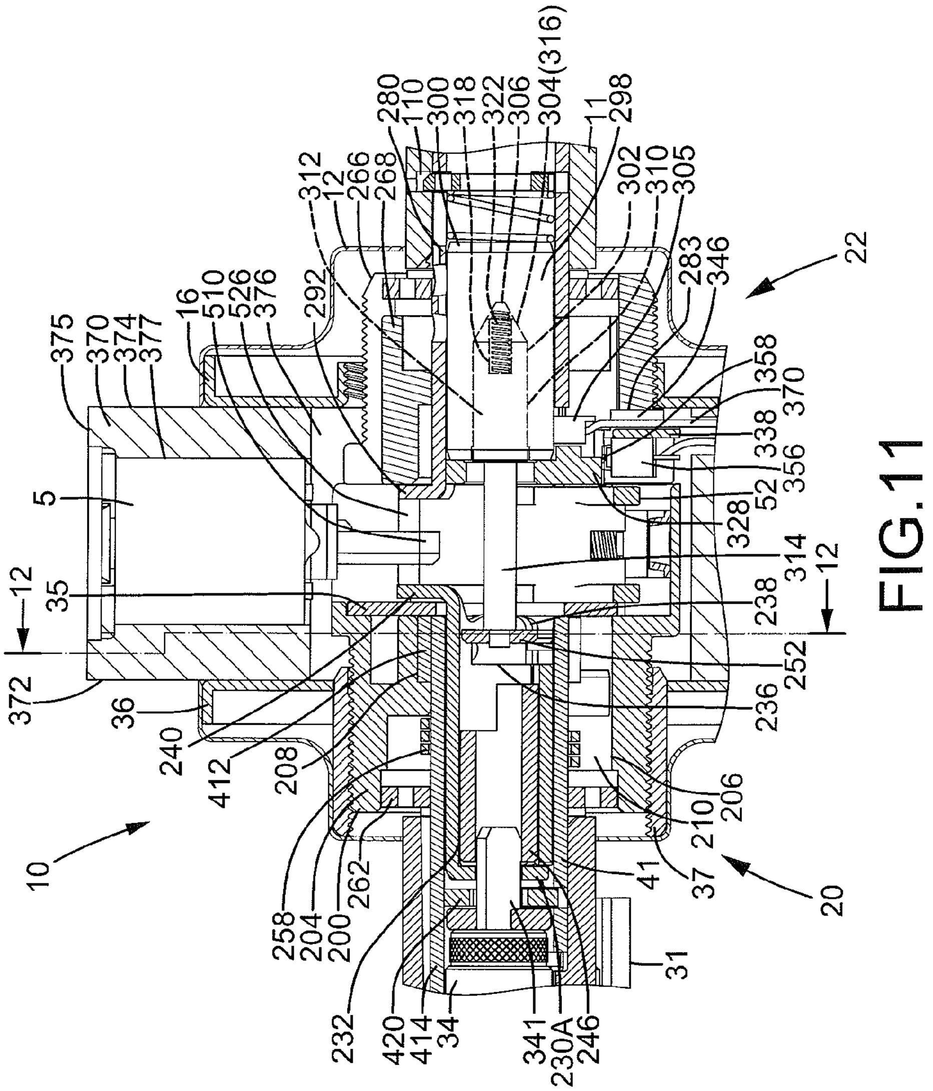
FIG. 11 shows a view similar to FIG. 9 with the outer handle rotated.
Figure 12:
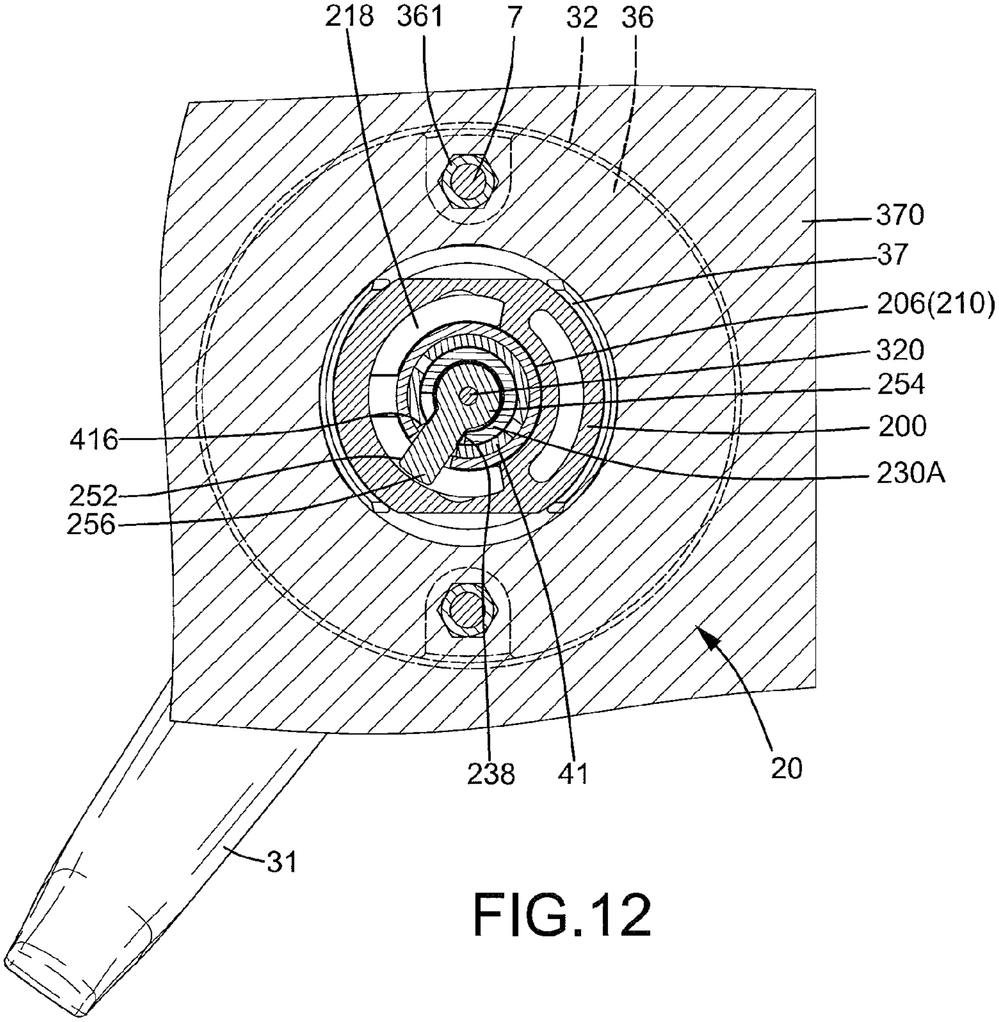
FIG. 12 shows a cross sectional view of FIG. 11 according to section line 12-12 of FIG. 11.

When driving device 298 is supplied with electricity by power supply 378, driving device 298 generates magnetic force to attract sliding rod 310 to move towards bottom face 306 of sliding hole 302 along the longitudinal axis and to compress spring 322. Conical section 316 of sliding rod 310 presses against conical portion 304. Driving member 252 is moved from the first position (FIG. 5) to the second position (FIG. 9). Leg 256 of driving member 252 is received in second groove section 238. In this state, when outer handle 31 is rotated about the longitudinal axis, outer spindle 41 rotates jointly with outer handle 31 due to provision of outer engaging plate 420. Leg 256 of driving member 252 is pushed by the peripheral wall of passageway 416 so that driving member 252 rotates jointly with outer spindle 41. Leg 256 of driving member 252 presses against a peripheral wall of second groove section 238 such that actuating member 230A rotates jointly with driving member 252 about the longitudinal axis. Lug 240 of actuating member 230A presses against first actuation wall 522 of retractor 52 and, thus, moves retractor 52 from the third position (FIG. 5) to the fourth position (FIG. 11), and latch bolt 51 is moved to the unlatching position (FIG. 11). In this state, door 370 is unlatched and openable when outer handle 31 is rotated. Cylindrical lock 10 is assembled in a manner that cylindrical lock 10 is in an unlocking state after driving device 298 is supplied with electricity, and outer handle 31 can be operated to open door 370.

Figure 13:
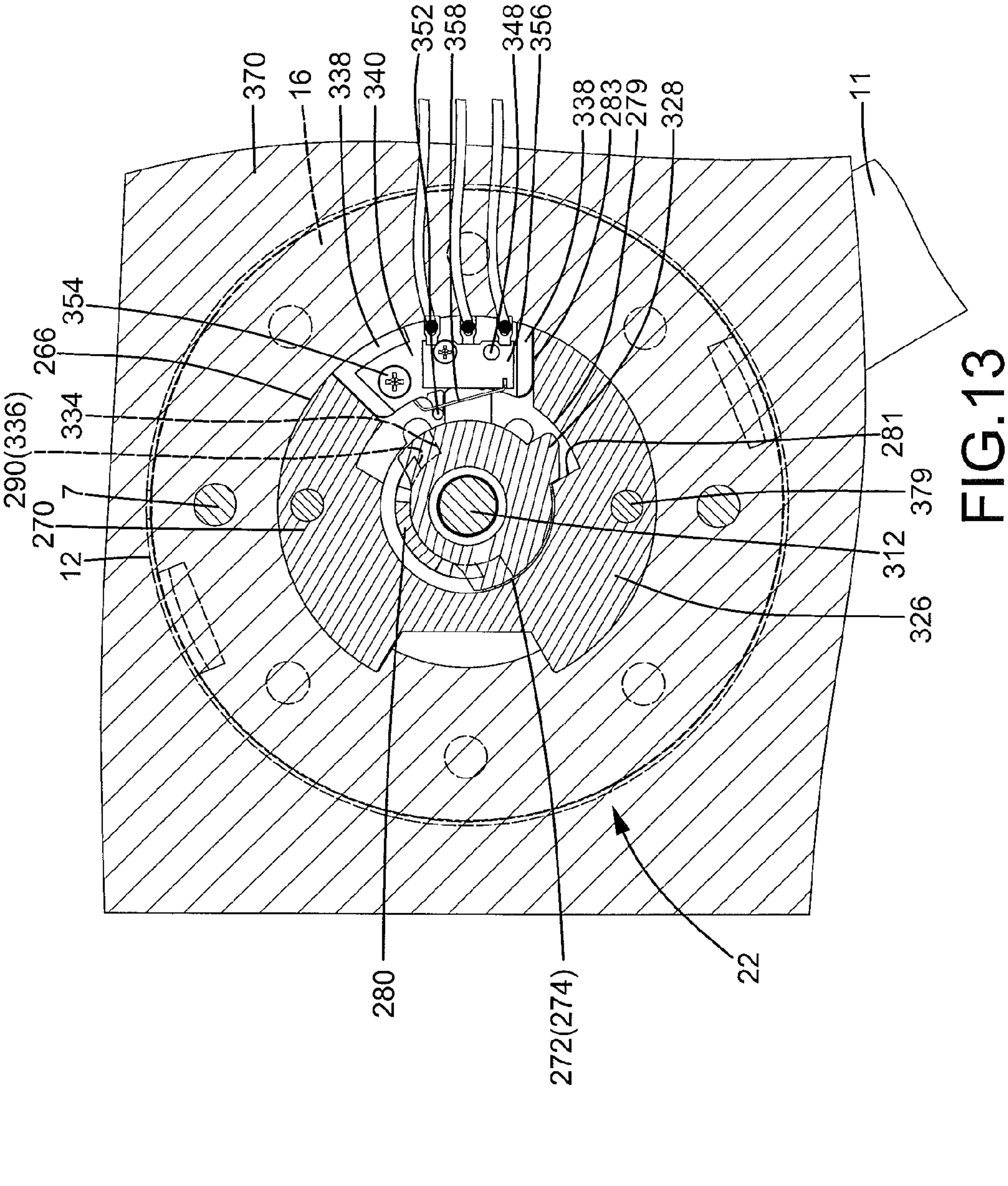
FIG. 13 shows a view similar to FIG. 7 with an inner handle rotated through an angle.

Furthermore, door 370 can be opened by rotating inner handle 11 of inner operational device 22 before or after driving device 298 is supplied with electricity. Specifically, when inner handle 11 is rotated about the longitudinal axis, inner spindle 280 rotates jointly with inner handle 11 due to inner engaging plate 296. Ear 292 of inner handle 11 pushes retractor 52 from the third position to the fourth position (FIG. 11) in the radial direction. First actuation wall 522 of retractor 52 is also moved away from lug 240. Connecting end 526 of retractor 52 actuates engagement portion 510 of latch device 5 and, thus, moves latch bolt 51 from the latching position to the unlatching position in the direction perpendicular to the longitudinal axis. Furthermore, when inner spindle 280 rotates, engaging faces 290 of inner spindle 280 push abutment faces 336 of pressing member 326, causing joint rotation of pressing member 326 and inner spindle 280. Pressing block 328 of pressing member 326 disengages from pressing plate 358 of detection member 356 (FIG. 13). Furthermore, pressing block 328 of pressing member 326 abuts against restraining wall 281 of restraining groove 279 to restrain the rotational angle of inner handle 11. Further, pressing plate 358 of detection member 356 is stopped by restraining peg 352 of seat 338 such that returning of pressing member 326 will not be hindered by pressing plate 358. Further, inner spring 362 is twisted when inner spindle 280 is rotated, providing resiliency for returning inner handle 11 when inner handle 11 is released.

In cylindrical lock 10 according to the present invention, detection member 356 and pressing member 326 are mounted in inner operational device 22 such that burglarproof system 380 can detect whether cylindrical lock 10 is unlocked by inner operating device 22. Detecting member 356 and burglarproof system 380 can be arranged in differing ways according to different situations. As an example, when used in a large space such as a mall, customers can not access limited areas of the mall that are only for personnel. Thus, it is necessary to install a lock that can detect whether door 370 is opened by inner operational device 22. When burglarproof system 380 is activated and when door 370 is opened by operating inner operational device 22, burglarproof system 380 will generate an alarm to inform the personnel of intrusion of limited areas by an unauthorized person.

Figure 14:
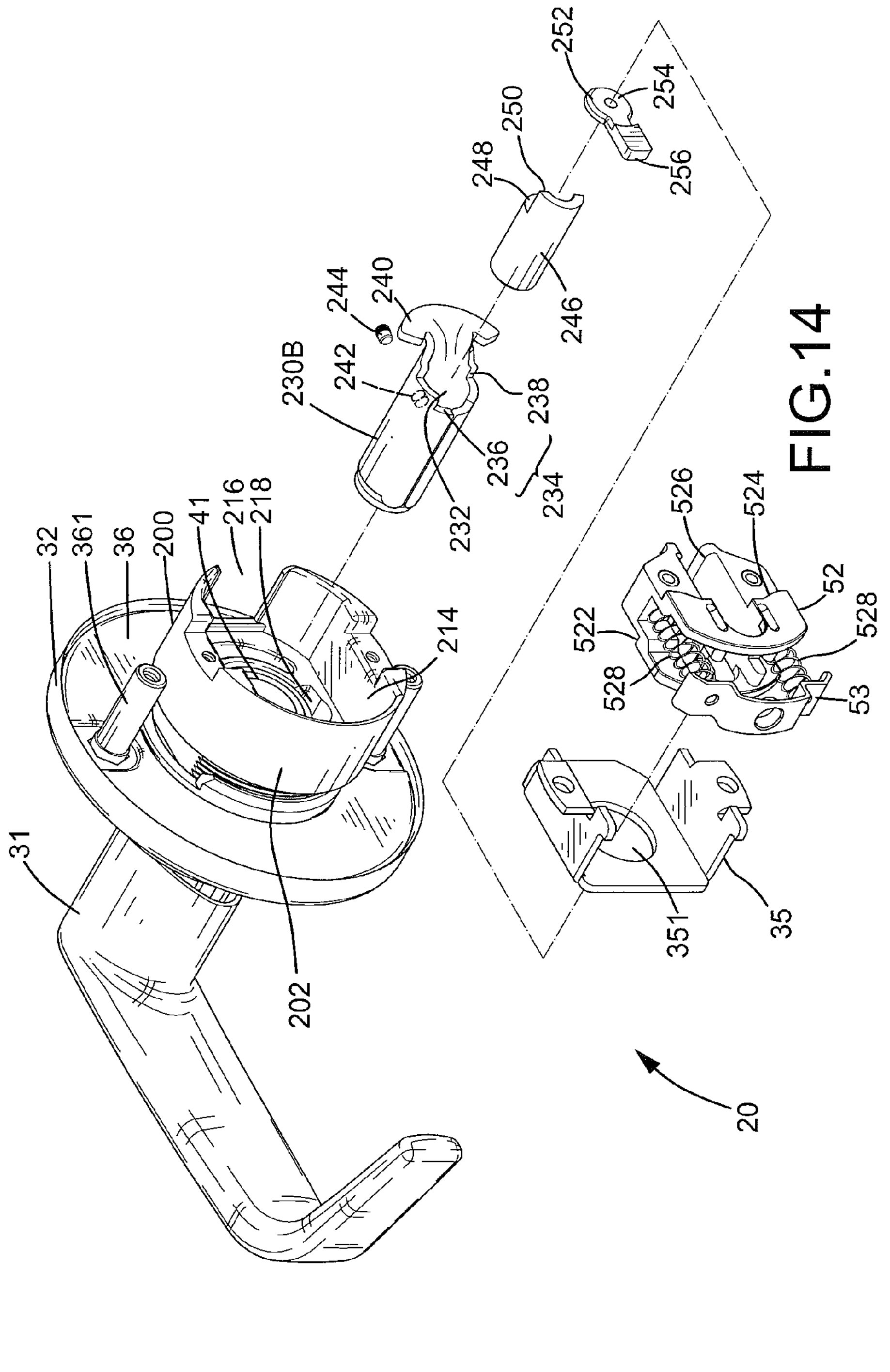
FIG. 14 shows a partial, exploded, perspective view of an outer operational device of a cylindrical lock of a second embodiment according to the present invention.
Figure 15:
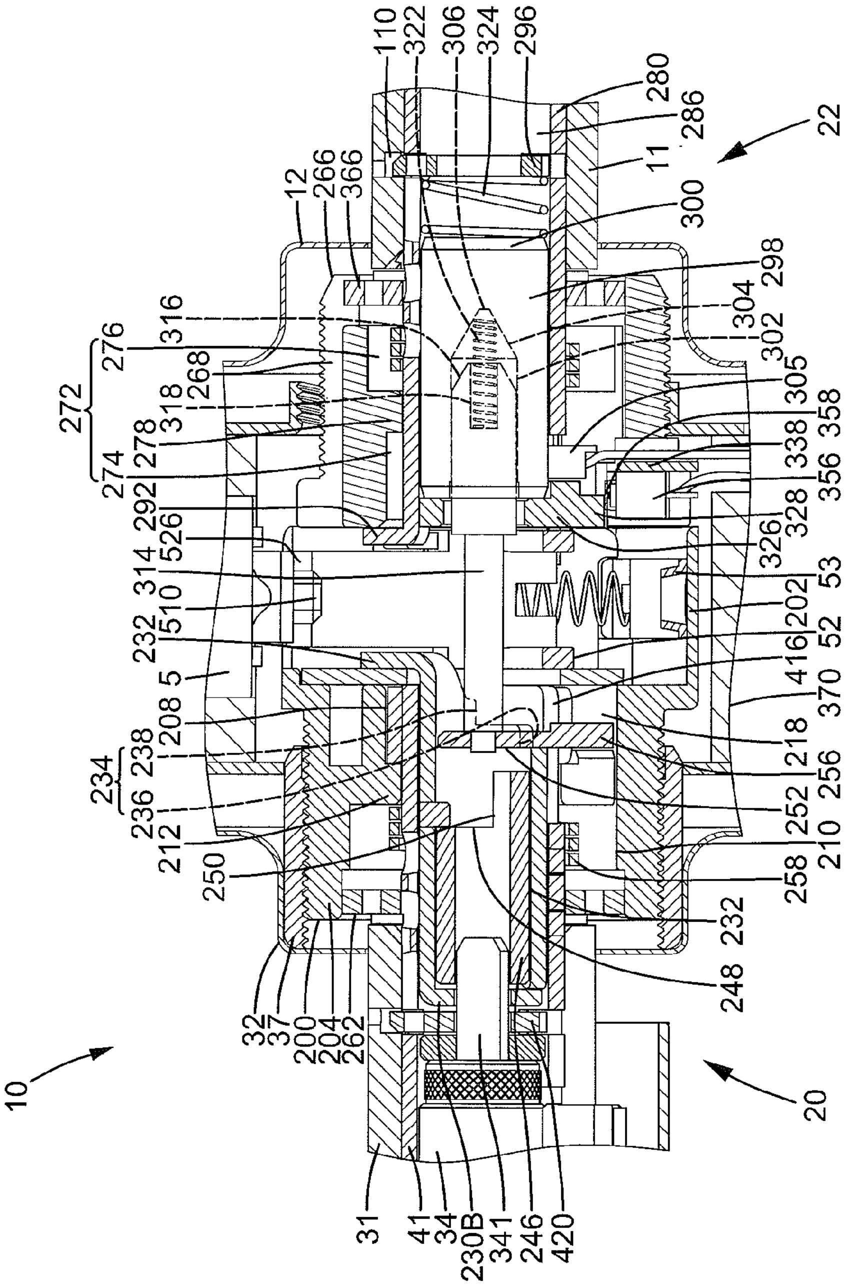
FIG. 15 shows a cross sectional view of the cylindrical lock of FIG. 14.

FIGS. 14 and 15 show a second embodiment of cylindrical lock 10 according to the present invention. Specifically, cylindrical lock 10 of the second embodiment includes an actuating member 230B that is substantially the same as actuating member 230A except that the arc of the first groove section 236 of actuating member 230B is smaller than that of second groove section 238 of actuating member 230B. Specifically, the width of leg 256 is only slightly smaller than the arc of first groove section 236 of actuating member 230A in the circumferential direction. Furthermore, the width of leg 256 is smaller than the arc of second groove section 238 of actuating member 230A in the circumferential direction. The arc of first groove section 236 of actuating member 230B in the circumferential direction is preferably the same as the arc of second groove section 238 of actuating member 230A. The arc of second groove section 238 of actuating member 230B in the circumferential direction is preferably the same as the arc of first groove section 236 of actuating member 230A.

Operation of cylindrical lock 10 of the second embodiment will now be set forth. In particular, for the sake of explanation, it will be assumed that door 370 is in a closed state, and cylindrical lock 10 is not operated (inner and outer handles 11 and 31 are in horizontal positions). Retractor 52 is in the third position with latch bolt 51 in the latching position. Power supply 378 has not supplied driving device 298 with electricity yet. Sliding rod 310 is biased by spring 322 and brings driving member 252 to the first position. Leg 256 of driving member 252 is received in first groove section 236.

When driving device 298 is not supplied with electricity by power supply 378, since the arc of the first groove section 236 of actuating member 230B is slightly larger than the width of leg 256 of driving member 252, rotation of outer handle 31 causes joint rotation of outer spindle 41 due to outer engaging plate 420. Driving member 252 rotates jointly with outer spindle 41 and pivots actuating member 230B, moving retractor 52 to the fourth position and moving latch bolt 51 to the unlatching position.

Figure 16:
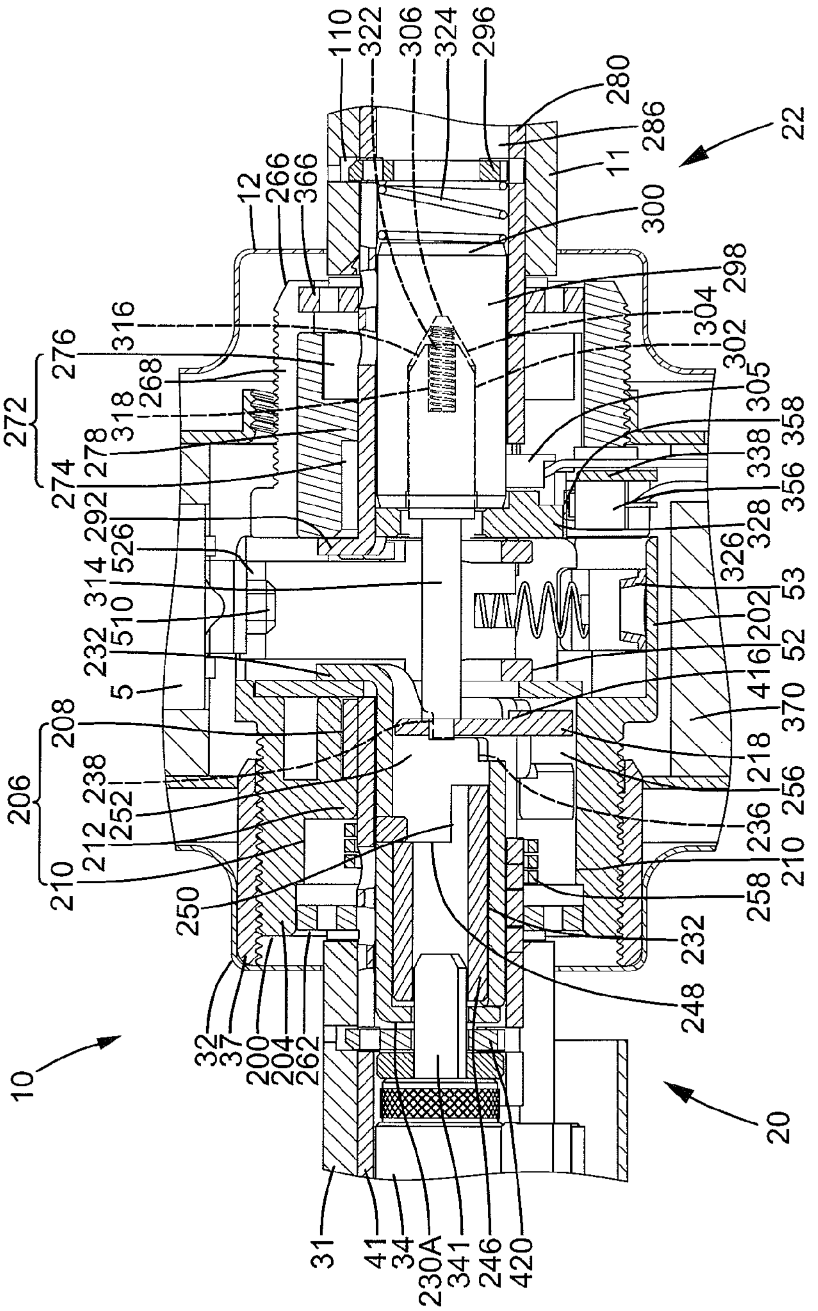
FIG. 16 shows a view similar to FIG. 15 with an actuating member moved by a sliding rod after electricity is supplied to a driving device.
Figure 17:
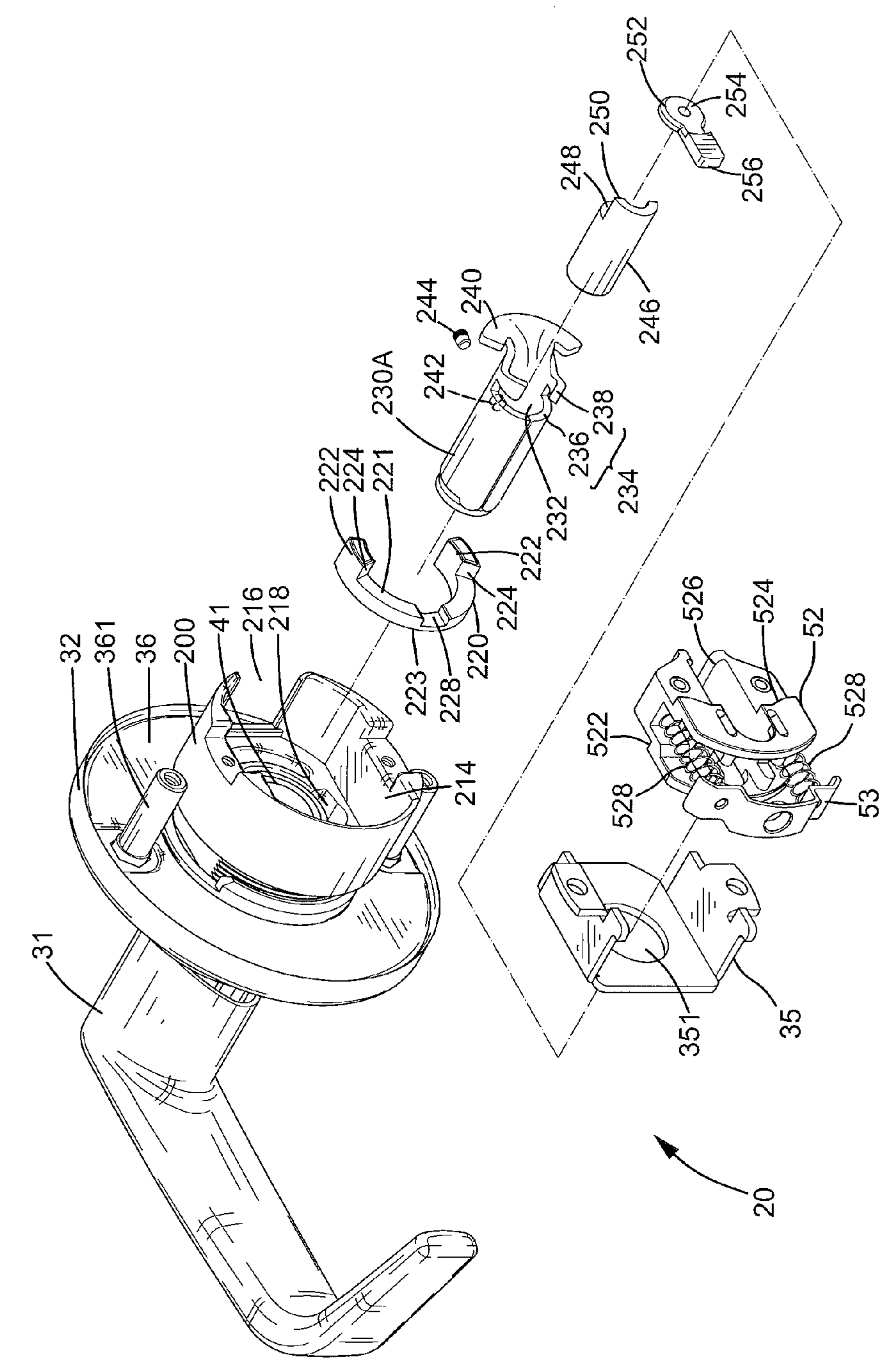
FIG. 17 shows a partial, exploded, perspective view of an outer operational device of a cylindrical lock of a third embodiment according to the present invention.
Figure 18:
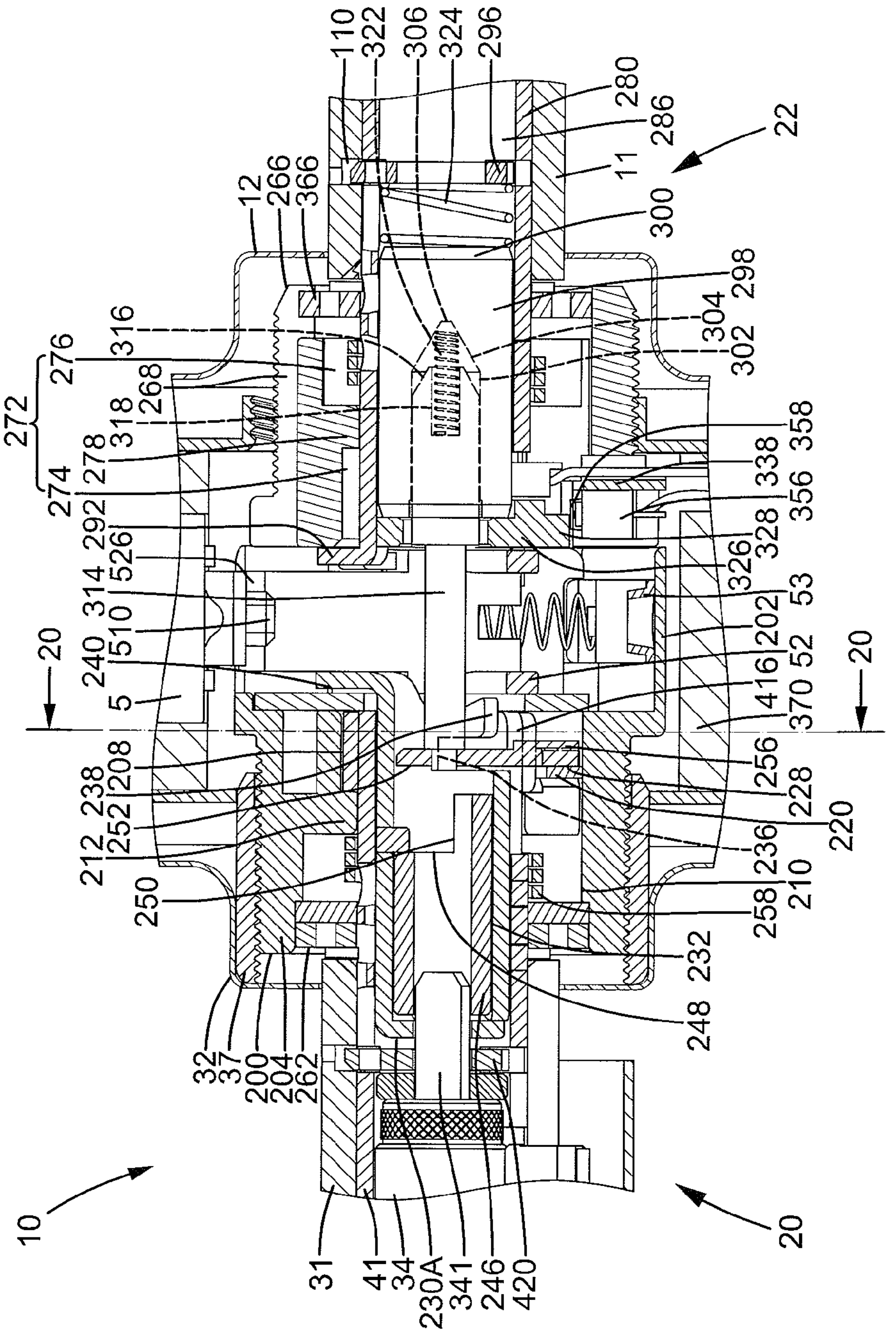
FIG. 18 shows a cross sectional view of the cylindrical lock of FIG. 17.
Figure 19:
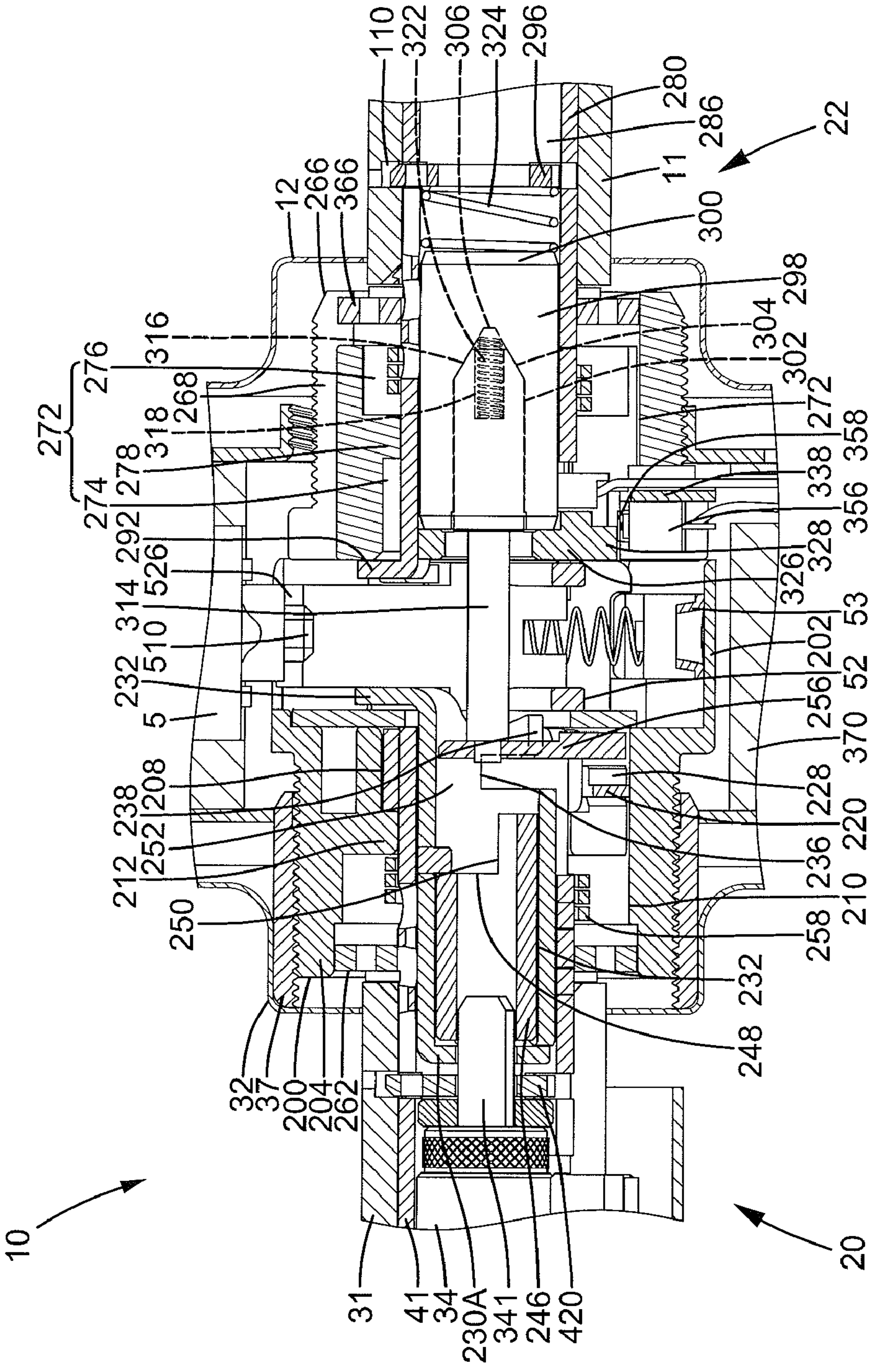
FIG. 19 shows a view similar to FIG. 18 with an actuating member moved by a sliding rod after electricity is supplied to a driving device.
Figure 20:
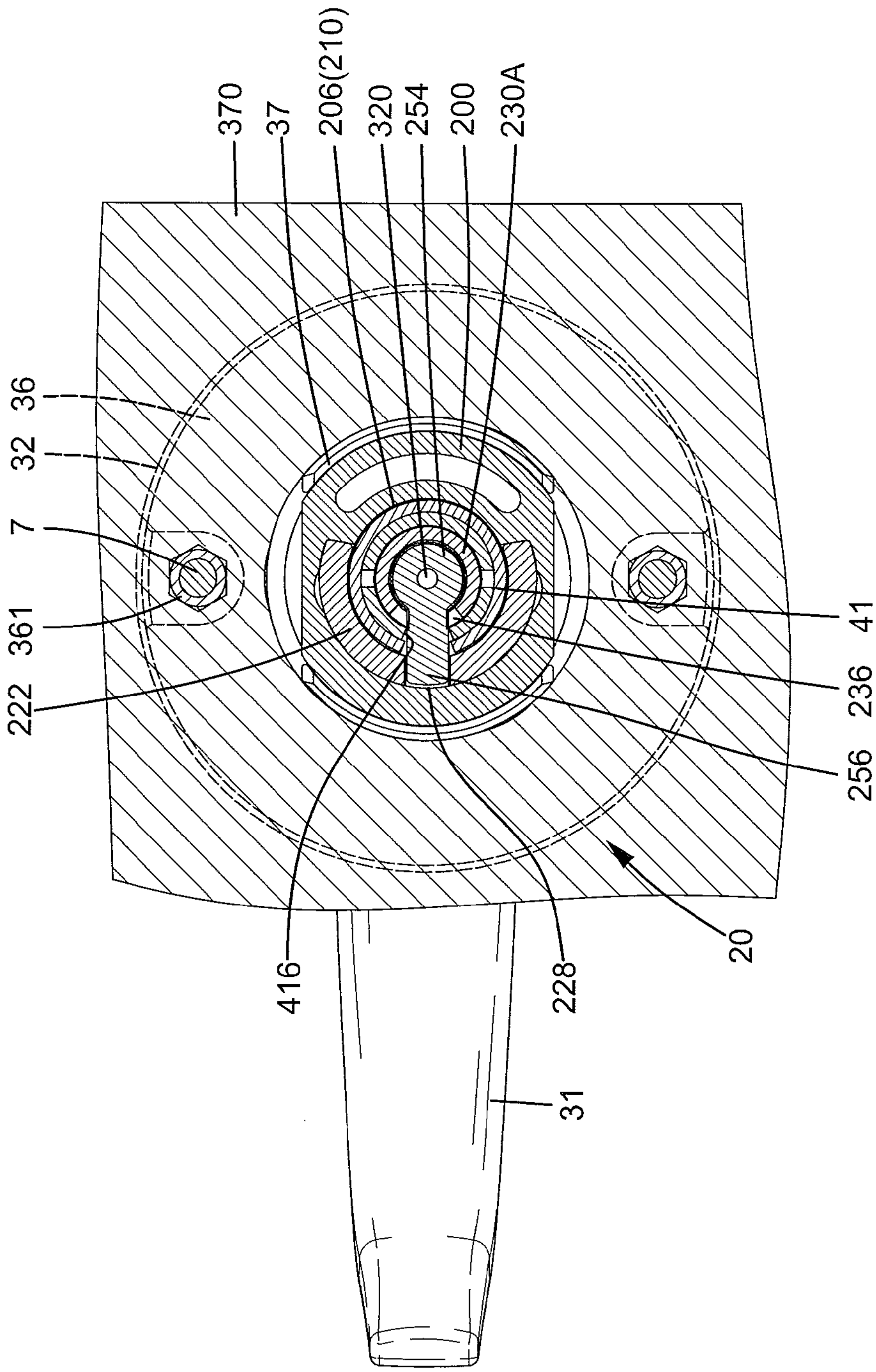
FIG. 20 shows a cross sectional view of FIG. 19 according to section line 20-20 of FIG. 18.
Figure 21:
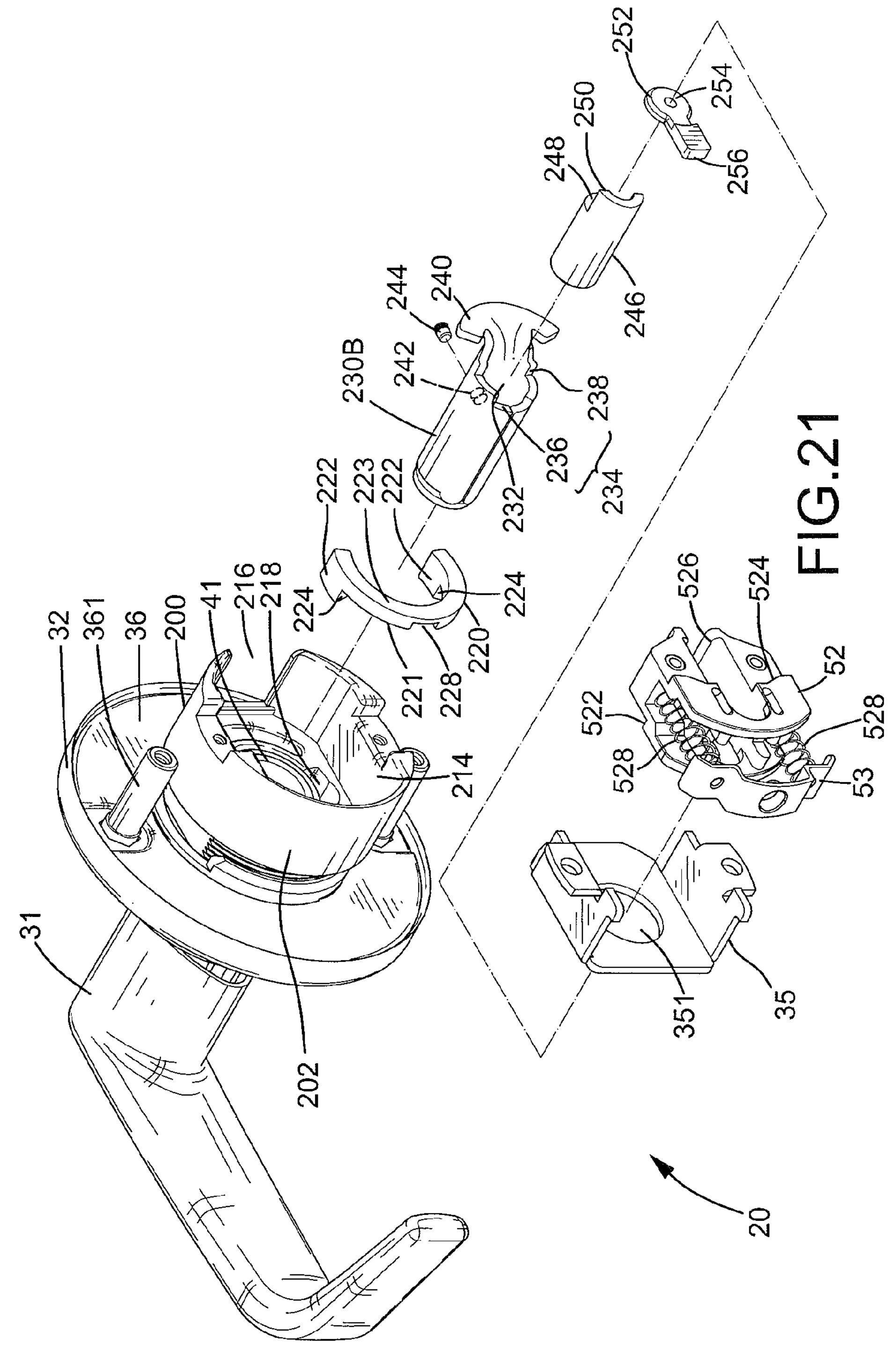
FIG. 21 shows a partial, exploded, perspective view of an outer operational device of a cylindrical lock of a fourth embodiment according to the present invention.
Figure 22:
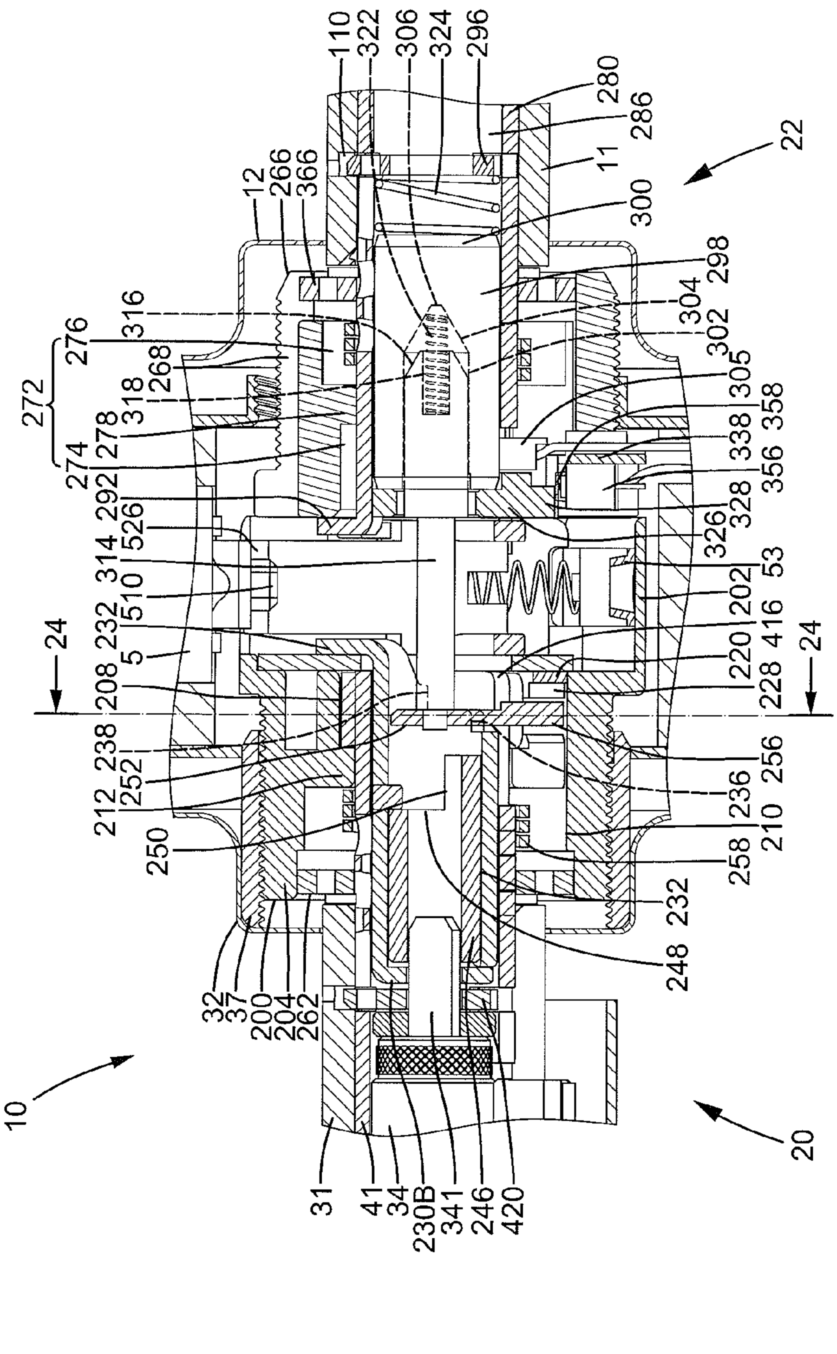
FIG. 22 shows a cross sectional view of the cylindrical lock of FIG. 21.

When driving device 298 is supplied with electricity by power supply 378, driving device 298 generates magnetic force to attract sliding rod 310 to move towards bottom face 306 of sliding hole 302 along the longitudinal axis and to compress spring 322. Conical section 316 of sliding rod 310 presses against conical portion 304. Driving member 252 is moved from the first position (FIG. 15) to the second position (FIG. 16). Leg 256 of driving member 252 is received in second groove section 238. In this state, when outer handle 31 is rotated about the longitudinal axis, since the arc of second groove section 238 in the circumferential direction is larger than the rotatable angle (about 45° to the horizontal position) of outer handle 31 and outer spindle 41, driving member 252 can only rotate in second groove section 238 without driving actuating member 230B when driving member 252 rotates. Since actuating member 230B is not rotated, retractor 52 is biased by springs 528 to be in the third position. Latch bolt 51 of latch device 5 remains in the latching position.

Operation of cylindrical lock 10 of the second embodiment by inner operational device 22 is identical to that of cylindrical lock 10 of the first embodiment.

Through selective use of actuating member 230A or 230B, different operational modes can be obtained. Specifically, when actuating member 230A is used (the first embodiment shown in FIGS. 1-13), cylindrical lock 10 is in a locking state when driving device 298 is driving device 298 is not supplied with electricity and is in an unlocking state when driving device 298 is supplied with electricity. On the other hand, when actuating member 230B is used (the second embodiment shown in FIGS. 14-16), cylindrical lock 10 is in an unlocking state when driving device 298 is not supplied with electricity and is in a locking state when driving device 298 is supplied with electricity.

It is noted that, in cylindrical locks 10 of the first and second embodiments shown in FIGS. 1-14, operation of outer handle 31 is free rotation when cylindrical lock 10 is in the locking state.

FIGS. 17-20 show a cylindrical lock 10 of a third embodiment according to the present invention which is substantially the same as the first embodiment except that outer operational device 20 of cylindrical lock 10 of the third embodiment further includes a substantially C-shaped limiting member 220. Limiting member 220 includes first and second sides 221 and 223 spaced along the longitudinal axis. A stop 222 is formed on two distal ends of first side 221 and includes an end wall 224. An engaging groove 228 is formed in an intermediate portion of first side 221 between end walls 224.

Limiting member 220 is received in groove 218 of outer chassis 200 with second side 223 of limiting member 220 abutting a wall of groove 218 and with first side 221 of limiting member 220 facing driving member 252. Leg 256 of driving member 252 extends through a space defined between end walls 224 of limiting member 220.

Operation and the advantages of cylindrical lock 10 of the third embodiment will now be set forth. In particular, for the sake of explanation, it will be assumed that door 370 is in a closed state, and cylindrical lock 10 is not operated (inner and outer handles 11 and 31 are in horizontal positions). Retractor 52 is in the third position with latch bolt 51 in the latching position. Power supply 378 has not supplied driving device 298 with electricity yet. Sliding rod 310 is biased by spring 322 and brings driving member 252 to the first position. Leg 256 of driving member 252 is extended through first groove section 236 and engaged with engaging groove 228 of limiting member 220. In this state, when outer handle 31 is rotated to drive outer spindle 41 and driving member 252, rotation of driving member 252 is prevented due to engagement of leg 256 in engaging groove 228 of limiting member 220. Thus, rotation of outer handle 31 is stopped. Namely, the function of free rotation of outer handle 31 while cylindrical lock 10 is in the locking state of the first embodiment is eliminated in the third embodiment due to provision of limiting member 220.

When power supply 378 supplies driving device 298 with electricity, driving member 252 is moved to the second position in second groove section 238 of actuating member 230A. Leg 256 of driving member 252 disengages from engaging groove 228 of limiting member 220. In this state, rotation of outer handle 31 causes driving member 252 to rotate actuating member 230A, moving latch bolt 51 to the unlatching position (which is the same as the first embodiment). Since an angular spacing between end walls 224 of limiting member 220 in the circumferential direction is approximately equal to the rotating angle of outer handle 31 required for moving latch bolt 51 to the unlatching position, the structural strength of outer operational device 20 against torque is enhanced.

FIGS. 21-24 show a cylindrical lock 10 of a fourth embodiment according to the present invention which is substantially the same as that of the second embodiment except that cylindrical lock 10 of the fourth embodiment includes limiting member 220 of the third embodiment. However, the mounting direction of limiting member 220 in the fourth embodiment is opposite to that in the third embodiment. Specifically, limiting member 220 is received in groove 218 of outer chassis 200 with first side 221 of limiting member 220 facing groove 218 and with second side 223 of limiting member 220 abutting a face of partitioning plate 35. Stops 222 of limiting member 220 abut a wall of groove 218. Leg 256 of driving member 252 is located between end walls 224 of limiting member 220.

Operation and the advantages of cylindrical lock 10 of the fourth embodiment will now be set forth. In particular, for the sake of explanation, it will be assumed that door 370 is in a closed state, and cylindrical lock 10 is not operated (inner and outer handles 11 and 31 are in horizontal positions). Retractor 52 is in the third position with latch bolt 51 in the latching position. Power supply 378 has not supplied driving device 298 with electricity yet. Sliding rod 310 is biased by spring 322 and brings driving member 252 to the first position. Leg 256 of driving member 252 is received in first groove section 236 and disengaged from engaging groove 228 of limiting member 220. In this state, rotation of outer handle 31 causes driving member 252 to rotate actuating member 230B by pressing leg 256 against a wall of first groove section 236. Lug 240 is moved to actuate retractor 52, moving latch bolt 51 to the unlatching position.

Figure 23:
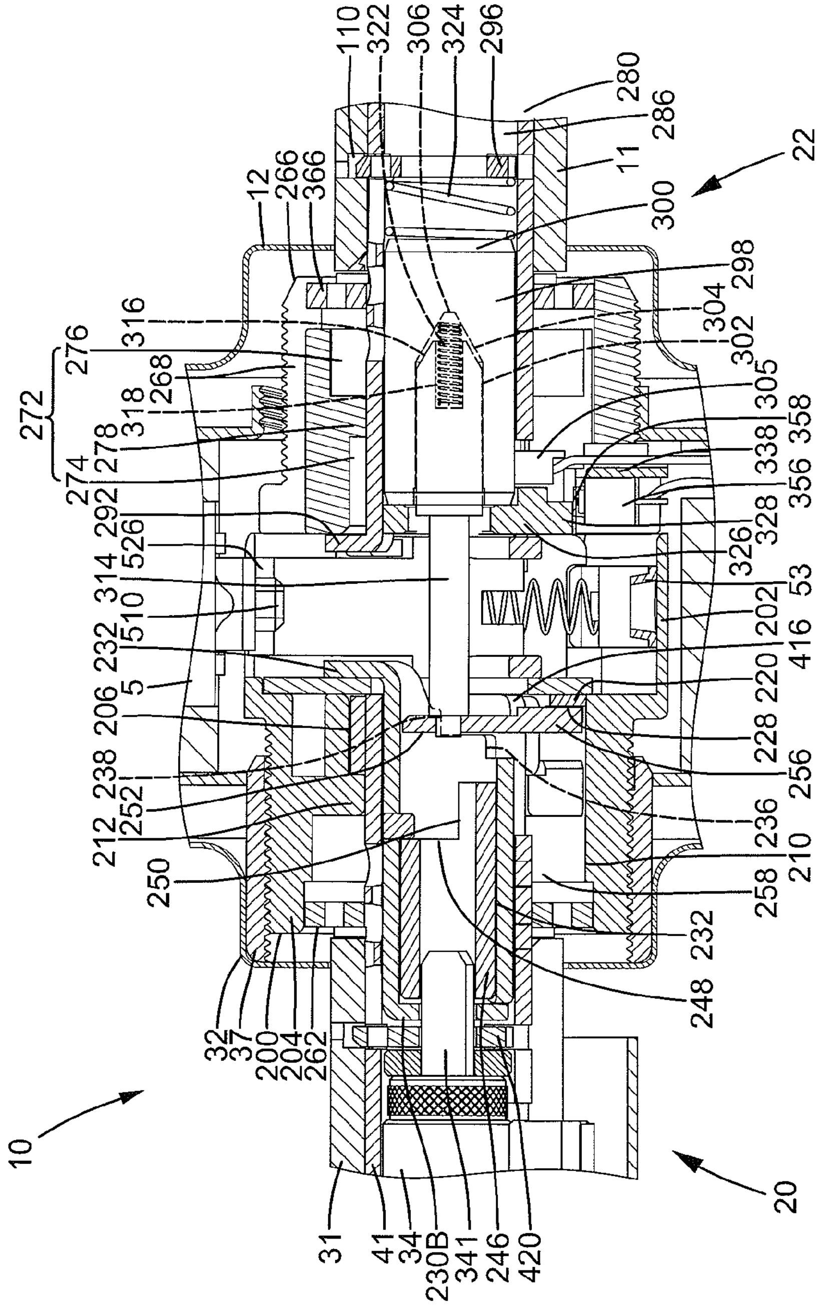
FIG. 23 shows a view similar to FIG. 22 with an actuating member moved by a sliding rod after electricity is supplied to a driving device.
Figure 24:
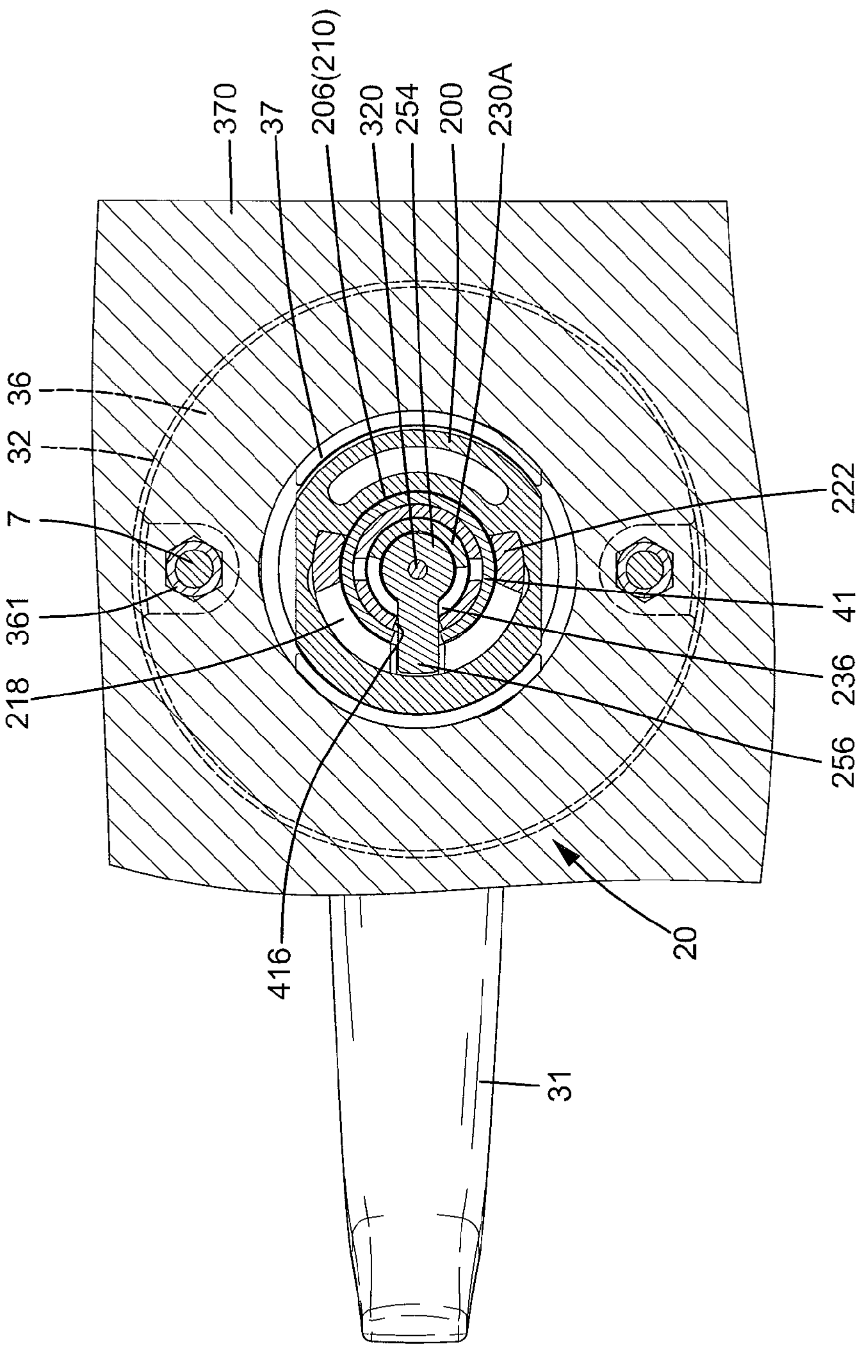
FIG. 24 shows a cross sectional view of FIG. 22 according to section line 24-24 of FIG. 22.

When power supply 378 supplies driving device 298 with electricity, driving device 298 attracts sliding rod 310 to slide along the longitudinal axis, moving driving member 252 to the second position. Leg 256 of driving member 252 is engaged with engaging groove 228 of limiting member 220 (FIG. 23). In this state, when outer handle 31 is rotated to drive outer spindle 41 and driving member 252, rotation of driving member 252 is prevented due to engagement of leg 256 in engaging groove 228 of limiting member 220. Thus, rotation of outer handle 31 is stopped. Namely, the function of free rotation of outer handle 31 while cylindrical lock 10 is in the locking state of the second embodiment is eliminated in the fourth embodiment due to provision of limiting member 220.

In any one of the first through fourth embodiments, whether cylindrical lock 10 is in the locking or unlocking state, a key can be utilized to operate lock core 34 of outer operational device 20 to open door 370. Specifically, when the key is rotated, tail piece 341 of lock core 34 rotates to drive follower 246 to rotate. After abutment wall 250 of follower 246 abuts follower pin 244 of actuating member 230A or 230B, further rotation of lock core 34 drives actuating member 230A or 230B to rotate by pushing follower pin 244 through follower 246, moving retractor 52 from the third position to the fourth position and moving latch bolt 51 from the latching position to the unlatching position.

In the first and second embodiments without limiting member 220, cylindrical lock 10 can be converted between a first mode and a second mode through selective use of actuating member 230A or actuating member 230B. Specifically, in the first mode using actuating member 230A (the first embodiment shown in FIGS. 1-13), cylindrical lock 10 is in a locking state when driving device 298 is not supplied with electricity and is in an unlocking state when driving device 298 is supplied with electricity. On the other hand, in the second mode using actuating member 230B (the second embodiment shown in FIGS. 14-16), cylindrical lock 10 is in an unlocking state when driving device 298 is not supplied with electricity and is in a locking state when driving device 298 is supplied with electricity. Furthermore, limiting member 220 can be added into either of first and second embodiments to relieve the free rotation of outer handle 31 when cylindrical lock 10 is in the locking state, as mentioned above. Thus, cylindrical locks 10 according to the present invention can be utilized in different locations according to different needs. The numbers and costs of the components of cylindrical locks 10 with different functions according to the present invention are significantly reduced. Furthermore, cylindrical locks 10 with different functions according to the present invention can be assembled in similar processes such that the assembling efficiency can be greatly increased and that the manufacturing costs can be reduced, for the workers can quickly adapt the procedures, techniques, and processes for assembling differing cylindrical locks 10 according to the present invention.

Now that the basic teachings of the present invention have been explained, many extensions and variations will be obvious to one having ordinary skill in the art. For example, outer operational device 20 does not have to include follower pin 244, follower 246, and lock core 34. Driving device 298 can be utilized to change the state (locking or unlocking) of cylindrical lock 10. Door 370 can still be opened by operating outer handle 31 while cylindrical lock 10 is in the unlocking state. Furthermore, outer operational device 20 does not have to include partitioning plate 35. In this case, first end 412 of outer spindle 41 mates with outer retainer ring 264 such that outer spindle 41 is rotatably mounted to outer chassis 200 and that outer spindle 41 is not movable along the longitudinal axis. Retractor 52 and outer engaging plate 420 stop actuating member 230A, 230B from moving along the longitudinal axis. Thus, cylindrical lock 10 can still be operated without partitioning plate 35. Further, when burglarproof system 380 is turned on, activation of alarm can be set according to pressing or not pressing of pressing plate 358 of detection member 356. As an example, in a type of commercially available burglarproof system 380, a portion of a solenoid is mounted to door 370, and the other portion of the solenoid is mounted to the door frame. When door 370 is opened, the two portions of the solenoid are not aligned with each other. When burglarproof system 380 is turned on, rotation of inner handle 11 causes pressing block 328 of pressing member 326 to press against pressing plate 358 of detection member 356, and burglarproof system 380 is temporarily deactivated for a period of time (such as 10 seconds). Thus, when door 370 is closed, the two portions are aligned with each other without activating the alarm. However, if outer handle 31 is rotated for opening door 370, pressing block 328 of pressing member 326 will not press against pressing plate 358 of detection member 356. When the two portions of the solenoid are not aligned with each other due to opening of door 370, the alarm will be activated. Further, burglarproof system 380 can be electrically connected to power supply 378. Thus, power supply 378 can supply burglarproof system 380 with electricity and can control on and off of burglarproof system 380.

Furthermore, inner operational device 22 does not have to include pressing member 326, seat 338, and detection member 356. In this case, cylindrical lock 10 is not electrically connected to burglarproof system 380. However, a user can still use a remote control to control electricity supply from power supply 378 to driving device 298 to change the locking or unlocking state of cylindrical lock 10. Further, door 370 can be still be opened through operation of inner and outer handles 11 and 31.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A cylindrical lock comprising:

an outer chassis including first and second portions spaced along a longitudinal axis, with a receiving space extending from an end face of the first portion towards but spaced from an end face of the second portion along the longitudinal axis, with a pivotal space extending from the end face of the second portion through the receiving space along the longitudinal axis, with the outer chassis adapted to be mounted in a mounting space of a door;

an outer spindle rotatably received in the pivotal space of the outer chassis, with the outer spindle including first and second ends spaced along the longitudinal axis, with a passageway extending from the first end of the outer spindle towards but spaced from the second end of the outer spindle along the longitudinal axis, with the first end of the outer spindle facing the receiving space of the outer chassis, with the second end of the outer spindle located outside of the outer chassis;

a first actuating member having first and second ends spaced along the longitudinal axis, with a space extending from the first end of the first actuating member towards but spaced from the second end of the first actuating member along the longitudinal axis, with a limiting groove extending from an end face of the first end of the first actuating member towards but spaced from the second end of the first actuating member along the longitudinal axis and in communication with the space of the first actuating member, with the limiting groove of the first actuating member including first and second groove sections in communication with each other, with each of the first and second groove sections of the first actuating member extending in a circumferential direction about the longitudinal axis, with the first groove section having a first arc in the circumferential direction, with the second groove section having a second arc in the circumferential direction larger than the first arc, with the first actuating member further including a lug spaced from the limiting groove of the first actuating member in a radial direction perpendicular to the longitudinal axis;

a second actuating member rotatably received in the outer spindle and having first and second ends spaced along the longitudinal axis, with a space extending from the first end of the second actuating member towards but spaced from the second end of the second actuating member along the longitudinal axis, with a limiting groove extending from an end face of the first end of the second actuating member towards but spaced from the second end of the second actuating member along the longitudinal axis and in communication with the space of the second actuating member, with the limiting groove of the second actuating member including first and second groove sections in communication with each other, with each of the first and second groove sections of the second actuating member extending in the circumferential direction about the longitudinal axis, with the first groove section having a third arc in the circumferential direction, with the second groove section having a fourth arc in the circumferential direction smaller than the third arc, with the second actuating member further including a lug spaced from the limiting groove of the second actuating member in a radial direction perpendicular to the longitudinal axis;

with one of the first and second actuating members selectively and rotatably received in the outer spindle with the limiting groove aligned with the passageway of the outer spindle and with the lug located outside of the outer spindle and received in the receiving space of the outer chassis;

a driving member rotatably received in the space of one of the first and second actuating members, with the driving member including a pivotal portion and a leg extending from the pivotal portion in a direction perpendicular to the longitudinal axis, with the leg extending through the limiting groove of one of the first and second actuating members and through the passageway of the outer spindle, with the leg movable in the passageway along the longitudinal axis between first and second positions, with the leg in the first position received in the first groove section, with the leg in the second position received in the second groove section;

an outer handle connected to the second end of the outer spindle to rotate therewith;

a retractor received in the receiving space of the outer chassis, with the retractor operatively coupled to the lug of one of the first and second actuating members, with the retractor movable between third and fourth positions in a direction perpendicular to the longitudinal axis, with a latch bolt operatively connected to the retractor and movable between a latching position outside of the door and an unlatching position inside the door;

an inner chassis engaged with the outer chassis and facing the receiving space, with the inner chassis including first and second ends spaced along the longitudinal axis, with a mounting hole extending from the second end of the inner chassis through the first end of the inner chassis along the longitudinal axis, with the inner chassis adapted to be mounted in the mounting space of the door;

an inner spindle rotatably received in the mounting hole of the inner chassis, with the inner spindle including first and second ends spaced along the longitudinal axis, with the first end of the inner spindle connected to the retractor to move therewith, with the second end of the inner spindle located outside of the inner chassis, with the retractor movable between the third and fourth positions when the inner spindle rotates;

a driving device received in the inner spindle, with the driving device adapted to be electrically connected to a power supply, with the cylindrical lock including first and second modes, with the first actuating member assembled in the outer spindle when the cylindrical lock is in the first mode, with the second actuating member assembled in the outer spindle when the cylindrical lock is in the second mode, wherein the cylindrical lock in the first mode is in a locking state when the driving device is not supplied with electricity and is in an unlocking state when the driving device is supplied with electricity, wherein the cylindrical lock in the second mode is in an unlocking state when the driving device is not supplied with electricity and is in a locking state when the driving device is supplied with electricity;

a sliding rod received in the driving device and slideable along the longitudinal axis, with the sliding rod including a coupling end securely connected to the driving member, wherein the driving member is in the first position when the driving device is not supplied with electricity from the power supply, wherein the driving member moves from the first position to the second position together with the sliding rod when the driving device is supplied with electricity from the power supply;

an inner handle connected to the second end of the inner spindle to rotate therewith;

wherein when the first actuating member is assembled in the outer spindle and when the driving member is in the first position with the leg received in the first groove section of the first actuating member, rotation of the outer handle causes rotation of the leg of the driving member in the first groove section of the first actuating member without moving the first actuating member and the latch bolt, wherein when the first actuating member is assembled in the outer spindle and when the driving member is in the second position with the leg received in the second groove section of the first actuating member, rotation of the outer handle causes joint rotation of the driving member and the first actuating member, moving the latch bolt from the latching position to the unlatching position, wherein when the second actuating member is assembled in the outer spindle and when the driving member is in the second position with the leg received in the second groove section of the second actuating member, rotation of the outer handle causes rotation of the leg of the driving member in the first groove section of the second actuating member without moving the second actuating member and the latch bolt, wherein when the second actuating member is assembled in the outer spindle and when the driving member is in the first position with the leg received in the second groove section of the second actuating member, rotation of the outer handle causes joint rotation of the driving member and the second actuating member, moving the latch bolt from the latching position to the unlatching position.

2. The cylindrical lock as claimed in claim 1, further comprising: a limiting member, with the pivotal space of the outer chassis including first and second sections with an inner flange located intermediate the first and second sections, with the first section in communication with the receiving space, with a groove formed in an inner periphery of the first section, with the limiting member having substantially C-shaped cross sections corresponding to the groove, with the limiting member including first and second sides spaced along the longitudinal axis, with the first side of the limiting member including two distal ends each having a stop with an end wall, with an engaging groove formed in an intermediate portion of the first side of the limiting member between the end walls of the stops, with the limiting member received in the groove of the outer chassis, with the leg of the driving member extending through a space defined between the end walls of the stops, wherein when the cylindrical lock is in the first mode and when the driving member is in the first position, the leg of the driving member is engaged in the engaging groove of the limiting member, preventing rotation of the driving member when the outer handle is rotated, wherein when the cylindrical lock is in the first mode and when the driving member is in the second position, the leg of the driving member is disengaged from the engaging groove of the limiting member, allowing rotation of the driving member when the outer handle is rotated, wherein when the cylindrical lock is in the second mode and when the driving member is in the second position, the leg of the driving member is engaged in the engaging groove of the limiting member, preventing rotation of the driving member when the outer handle is rotated, wherein when the cylindrical lock is in the second mode and when the driving member is in the first position, the leg of the driving member is disengaged from the engaging groove of the limiting member, allowing rotation of the driving member when the outer handle is rotated.

3. The cylindrical lock as claimed in claim 2, with the second side of the limiting member abutting a wall of the groove of the outer chassis and with the first side of the limiting member facing the driving member when the first actuating member is assembled in the outer spindle.

4. The cylindrical lock as claimed in claim 2, with the first side of the limiting member facing the groove of the outer chassis and with the stops of the limiting member abutting a wall of the groove when the second actuating member is assembled in the outer spindle.

5. The cylindrical lock as claimed in claim 1, with the inner chassis further including a flange, with the flange including a restraining groove in communication with the mounting hole, with a fixing groove formed in an inner periphery of the mounting hole of the inner chassis and in communication with the restraining groove, with the driving device including a wire guide engaged in the fixing groove, preventing relative rotation between the driving device and the inner chassis.

6. The cylindrical lock as claimed in claim 5, with an insertion groove formed in a surface of the flange of the inner chassis facing the outer chassis, with the insertion groove in communication with the restraining groove and the mounting hole of the inner chassis, with a seat mounted in the insertion groove, with a detection member mounted on the seat, with the detection member including a pressing plate, with an extension section extending from an end face of the first end of the inner spindle away from the second end of the inner spindle along the longitudinal axis and having two engaging faces, with a pressing member received in the inner chassis and rotatably mounted around the sliding rod, with the pressing member including two arms extending from a side of the pressing member, with each of the two arms having a distal end with an abutment face, with a pressing block extending from an outer periphery of the pressing member in a radial direction perpendicular to the longitudinal axis for pressing the pressing plate of the detection member, with the abutment faces of the pressing member engaged with the two engaging faces of the inner spindle to allow joint movement of the pressing member and the inner spindle, with the pressing member and the inner spindle movable between a pressing position pressing against the pressing plate of the detection member and a non-pressing position not pressing against the pressing plate of the detection member, with the detection member adapted to be electrically connected to a burglarproof system, wherein when the burglarproof system is activated and when the pressing plate is pressed against by the pressing block, the burglarproof system is in one of generating an alarm and not generating the alarm, wherein when the burglarproof system is activated and when the pressing plate is not pressed against by the pressing block, the burglarproof system is in the other of generating the alarm and not generating the alarm, wherein when the burglarproof system is not activated, the alarm is not generated regardless of pressing of the pressing plate.

7. The cylindrical lock as claimed in claim 6, with the seat including a fixing wall, with a positioning peg formed on the fixing wall and extending through the detection member to fix the detection member, with a coupling portion formed on the fixing wall and including first and second lateral surfaces, with a wire groove extending from the first lateral surface through the second lateral surface of the coupling portion, with the driving device including a wire extending through the wire guide and the wire groove beyond the inner chassis and electrically connected to the power supply.

8. The cylindrical lock as claimed in claim 7, with the driving device including a sliding hole extending along the longitudinal axis, with the sliding rod including a follower portion slideably received in the sliding hole of the driving device, with a spring mounted between the follower portion of the sliding rod and a bottom face of the sliding hole, with the spring biasing the driving member to the first position.

9. The cylindrical lock as claimed in claim 8, with the sliding rod further including an extension having the coupling end, with the pressing member mounted around the follower portion of the sliding rod, with the coupling end of the sliding rod extending into one of the first and second actuating members and connected to the pivotal portion of the driving member.

* * * * *